US011156895B2

(12) United States Patent
Galstian et al.

(10) Patent No.: US 11,156,895 B2
(45) Date of Patent: Oct. 26, 2021

(54) CONTROLLABLE LIQUID CRYSTAL LAYERED FRESNEL LENS DEVICE

(71) Applicant: LensVector Inc., San Jose, CA (US)

(72) Inventors: Tigran Galstian, Quebec (CA); Karen Asatryan, Quebec (CA); Vladimir Presniakov, Quebec (CA); Aram Bagramyan, Quebec (CA); Armen Zohrabyan, Quebec (CA); Simon Careau, Quebec (CA)

(*) Notice: Subject to any disclaimer, the term of this patent is extended or adjusted under 35 U.S.C. 154(b) by 0 days.

(21) Appl. No.: 16/195,014

(22) Filed: Nov. 19, 2018

(65) Prior Publication Data

US 2019/0086761 A1 Mar. 21, 2019

Related U.S. Application Data

(63) Continuation of application No. PCT/CA2017/050620, filed on May 23, 2017, which
(Continued)

(51) Int. Cl.
*G02F 1/29* (2006.01)

(52) U.S. Cl.
CPC ............ *G02F 1/29* (2013.01); *G02F 1/294* (2021.01); *G02F 2201/08* (2013.01);
(Continued)

(58) Field of Classification Search
CPC combination set(s) only.
See application file for complete search history.

(56) References Cited

U.S. PATENT DOCUMENTS

2010/0245743 A1* 9/2010 Yokoyama ............... G02B 3/08
349/117
2011/0096252 A1 4/2011 Hee-Jin et al.
(Continued)

FOREIGN PATENT DOCUMENTS

CN 102540588 A 7/2012
CN 103323985 A 9/2013
(Continued)

OTHER PUBLICATIONS

PCT/CA2015/051222 international preliminary report on patentability of chapter I.
(Continued)

*Primary Examiner* — Lauren Nguyen
(74) *Attorney, Agent, or Firm* — Anglehart et al.

(57) ABSTRACT

A liquid crystal optical device providing refractive Fresnel lens type element control over light passing through an aperture is provided. The device includes a layer of liquid crystal material contained by flat substrates having flat alignment layers; and an arrangement of electrodes configured to provide a spatially varying voltage distribution within a number of lensing zones within said liquid crystal layer. The arrangement of electrodes includes ring-shaped electrodes defining boundaries between Fresnel lensing zones. The liquid crystal optical device is structured to provide a spatial variation in the optical phase delay with an abrupt transition at a boundary between lensing zones to increase the effective aperture of the optical device.

5 Claims, 19 Drawing Sheets

Related U.S. Application Data is a continuation-in-part of application No. 15/528,537, filed as application No. PCT/CA2015/051222 on Nov. 24, 2015, now Pat. No. 10,359,686.

(60) Provisional application No. 62/339,124, filed on May 20, 2016, provisional application No. 62/083,665, filed on Nov. 24, 2014, provisional application No. 62/216,951, filed on Sep. 10, 2015.

(52) U.S. Cl.
CPC .. *G02F 2201/121* (2013.01); *G02F 2201/122* (2013.01); *G02F 2201/128* (2013.01)

(56) References Cited

U.S. PATENT DOCUMENTS

| | | |
|---|---|---|
| 2011/0199548 A1 | 8/2011 | Takama |
| 2012/0188490 A1 | 7/2012 | Zohrabyan et al. |
| 2012/0293503 A1 | 11/2012 | Miyazawa et al. |
| 2013/0063691 A1 | 3/2013 | Takama et al. |
| 2013/0250223 A1 | 9/2013 | Takagi et al. |
| 2014/0036183 A1 | 2/2014 | Asatryan et al. |
| 2014/0139768 A1 | 5/2014 | Galstian et al. |
| 2016/0041449 A1 | 2/2016 | Clark et al. |

FOREIGN PATENT DOCUMENTS

| | | |
|---|---|---|
| CN | 103901680 A | 7/2014 |
| EP | 2682810 A1 | 1/2014 |
| KR | 20130031178 A | 3/2013 |
| WO | WO 2009/146530 A1 | 12/2009 |
| WO | WO 2014/071530 A1 | 5/2014 |
| WO | WO 2014/138974 A1 | 9/2014 |

OTHER PUBLICATIONS

PCT/CA2015/051222 international search report.
EP 15863807 search written opinion dated Jun. 6, 2018.
EP 15863807 supplementary search report dated Jun. 6, 2018.
PCT/CA2017/050620 IPRP dated Nov. 20, 2018.
PCT/CA2017/050620 ISR dated Sep. 15, 2017.
PCT/CA2017/050620 Search strategy.
Chinese application No. 201580073812.1 Office Action dated Dec. 9, 2020 with the brief translation.
Chinese application No. 201580073812.1 Office Action dated Jun. 15, 2020 with the brief translation.
U.S. Appl. No. 16/441,231 Office Action dated Mar. 17, 2020.
Chinese application No. 201580073812.1 search report with English translation dated Sep. 9, 2019.
Chinese application No. 201580073812.1 Office Action with English translation dated Sep. 9, 2019.
U.S. Appl. No. 15/528,537 office action dated Jul. 31, 2018.

* cited by examiner

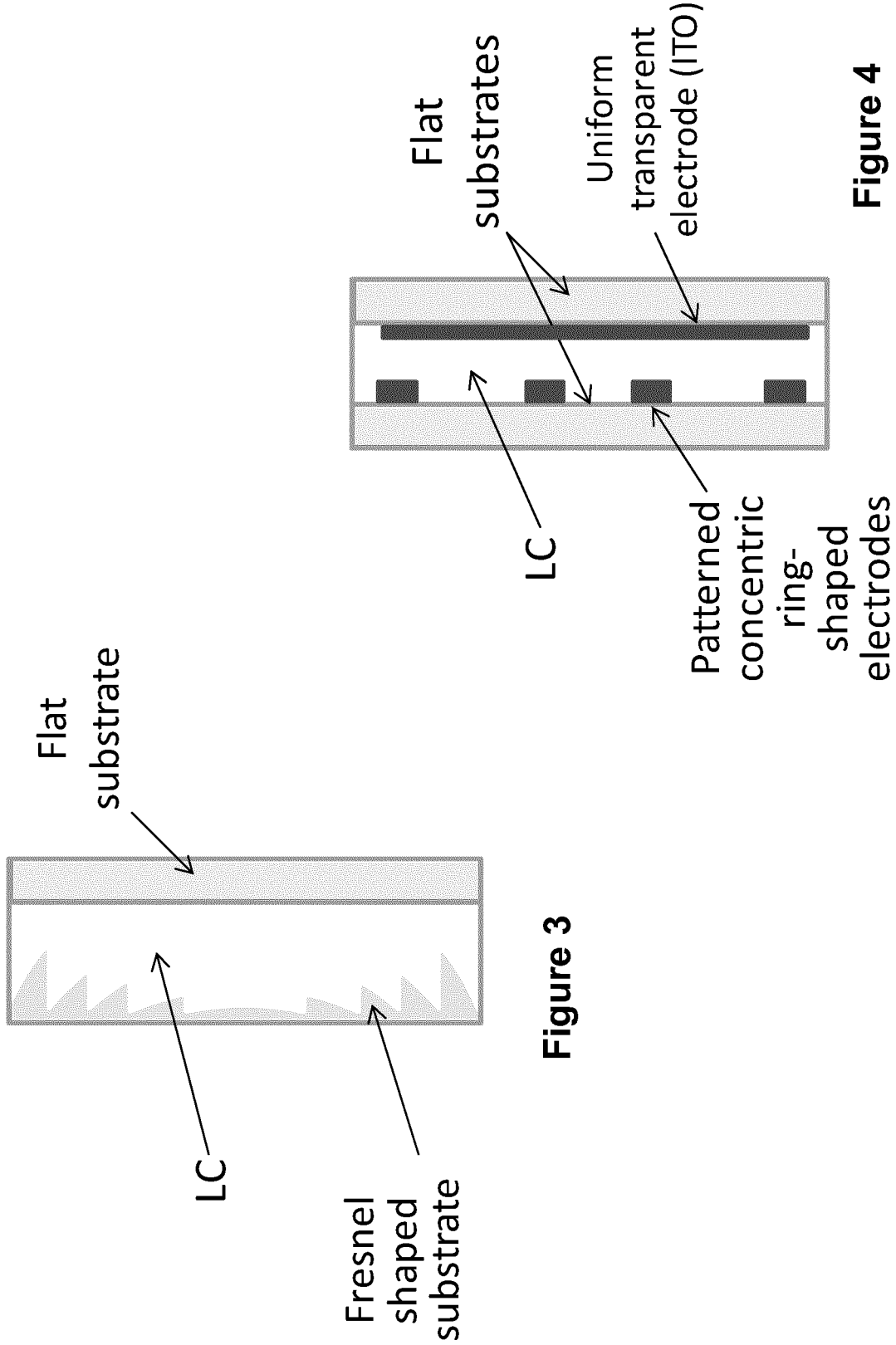

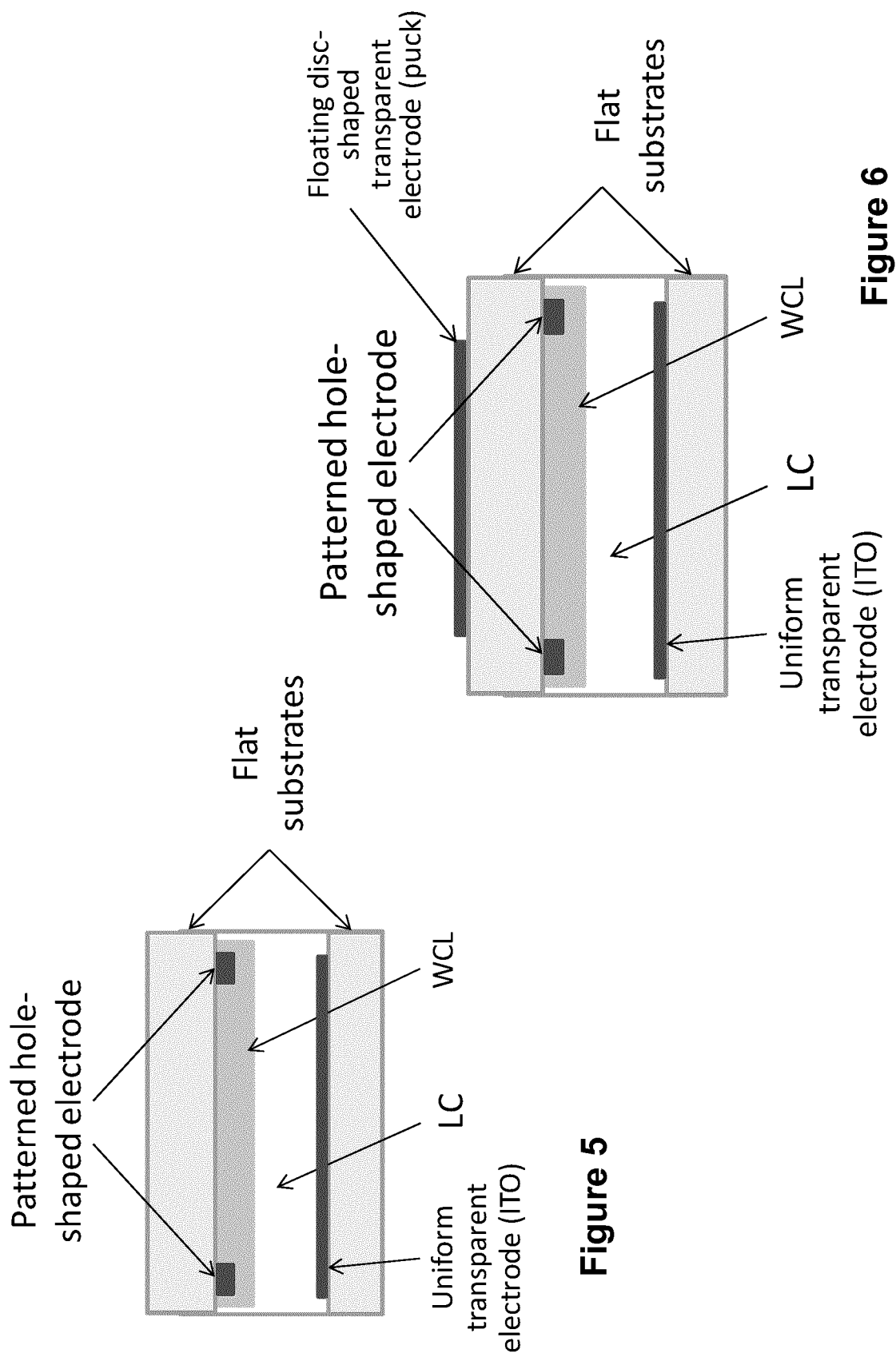

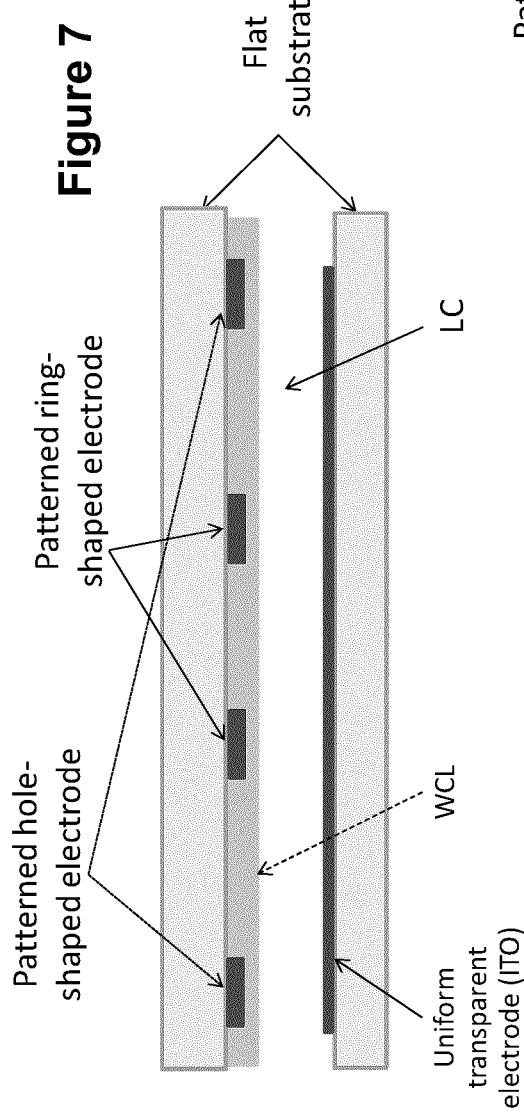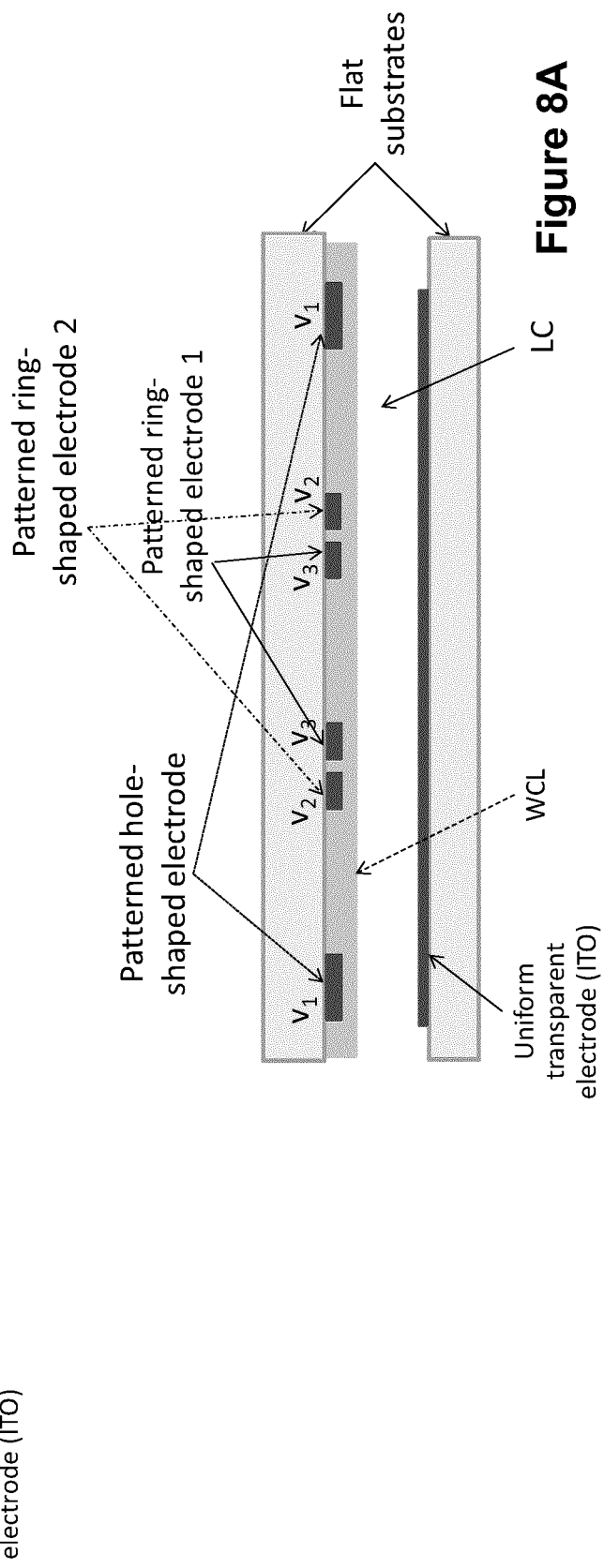

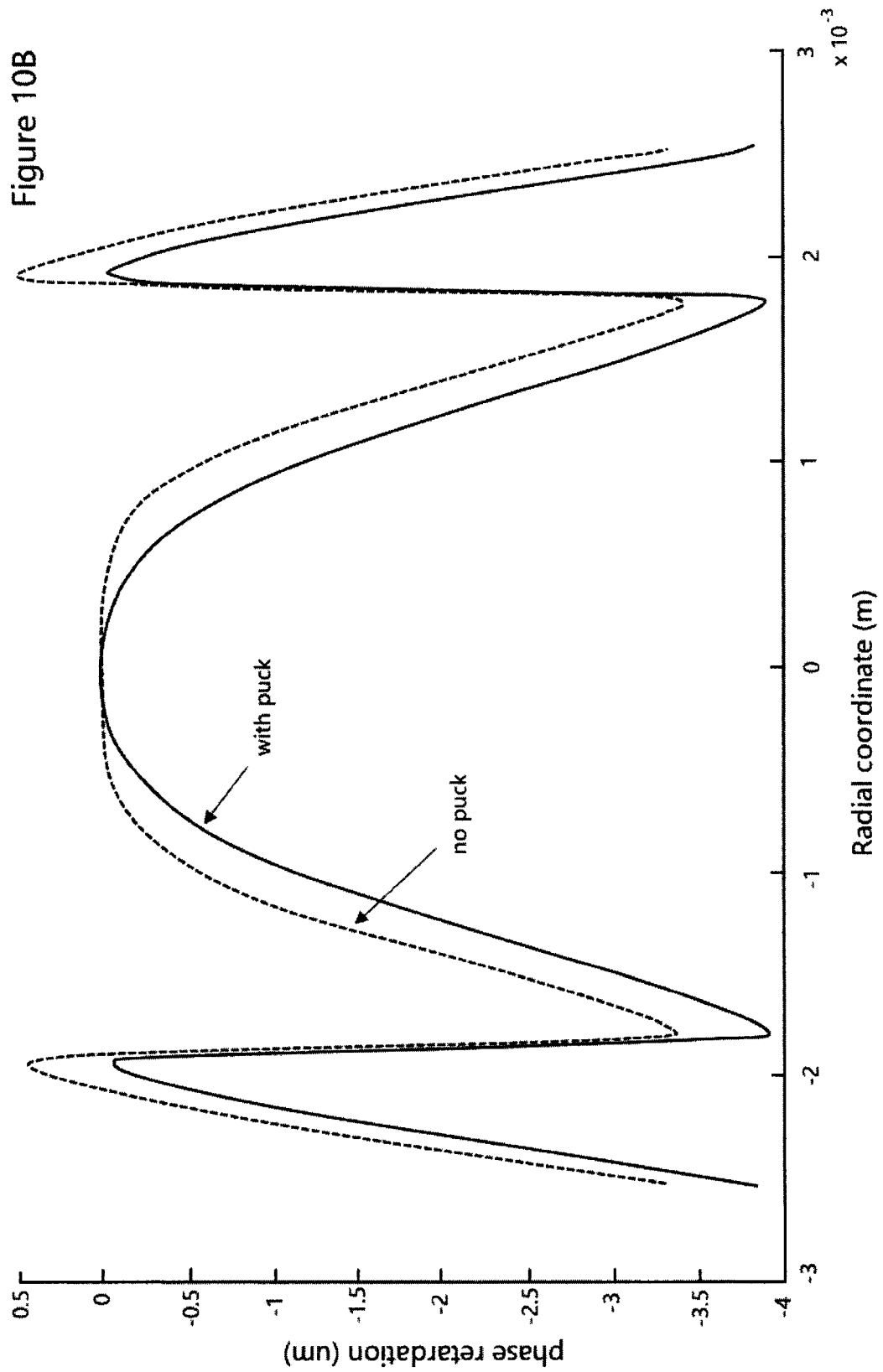

CONTROLLABLE LIQUID CRYSTAL LAYERED FRESNEL LENS DEVICE

REFERENCE TO RELATED APPLICATIONS

This application is a continuation of PCT/CA2017/050620 filed May 23, 2017, which claims priority of U.S. provisional patent application Ser. No. 62/339,124 filed May 20, 2016 and is a continuation-in-part of U.S. patent application Ser. No. 15/528,537 filed May 22, 2016, that is a national stage of PCT/CA2015/051222 filed Nov. 24, 2015 that claims priority of U.S. provisional patent application 62/083,665 filed Nov. 24, 2014 and of U.S. provisional patent application 62/216,951 filed Sep. 10, 2015, the contents of which are hereby incorporated by reference.

TECHNICAL FIELD

This disclosure relates to liquid crystal optical devices, such as lenses, which have multiple concentric lensing zones or segments.

BACKGROUND

Auto focus and optical zoom functions are examples of adaptive imaging. It is desirable for such systems to operate without moving parts which is not easy to achieve. Electrically variable lenses have been proposed for such uses with various limited levels of success.

Liquid Crystal (LC) based electrically variable lenses have been introduced to address such need. While such LC lenses have multiple advantages, they also have important limitations. Namely, in one architecture LC electrically variable lenses use non-uniform LC layers which are difficult to manufacture. Some of the reasons are described herein.

Lensing based on the Fresnel lensing principle has been proposed for LC electrically variable lens applications. The following short primer may be of benefit in order to contemplate problems with current technology. Physical (non-LC fixed) Fresnel lenses employ abrupt changes in refractive properties at boundaries between different zones (herein sometimes referred to as "micro elements" with the understanding that the zones, sections or micro elements are not necessary limited to very small dimensions). According to the Fresnel lensing approach, the spherical profile of, for example, a simple plano-convex lens as illustrated in FIG. 1A may be split into different zones as schematically represented in the FIG. 1B with the same local curvatures corresponding to the simple lens of FIG. 1A. Further zone division is however limited to phase delay jumps of, for example multiples of $2\pi$, for the particular light beam propagating therethrough. A thinner theoretically equivalent lensing structure as illustrated in FIG. 1C known as a Fresnel lens can be obtained which has the same focal length F or optical power $OP=\delta n/R$, where R is the radius of the (total) equivalent curvature (FIG. 1A) and $\delta n$ is the refractive index difference between the lens material and its surrounding environment (for example air). Good quality and miniaturization are complicated from a manufacturing point of view due to the difficulty to produce sharp corners. Corners which are too blunt (soft) produce aberrations. Simple physical Fresnel lenses (FIG. 1C), just like conventional lenses (FIG. 1A), are required to be moved to provide adaptive optics.

The Fresnel approach may be used with LC geometries in the hope of achieving motionless adaptive optics, for example by using a Fresnel-shaped substrate to form a non-uniform LC gap providing a spatially variable thickness of LC layer as illustrated in FIG. 3. However, this approach is rather complicated from a manufacturing point of view due to prevalence of soft corners, limited ability to provide LC alignment on the angled zone walls of the Fresnel shaped substrate, etc.

When the boundaries between the neighboring zones are not properly controlled, the useful portion of the optical device is reduced by boundary areas of improperly controlled liquid crystal.

SUMMARY

To address the above mentioned shortcomings, while using light propagation through LC electrically variable lenses employing uniform LC layers to control light propagation, a spatially non-uniform electric field must be used to generate a corresponding spatially non-uniform reorientation of LC molecular axes. These devices have spatial variations in the index of refraction due to the spatial variations in LC molecular orientation. This spatially non-uniform refractive index modulation, in turn, creates light propagation changes. For simple explanation one can consider the example of a single aperture GRadient INdex (GRIN) LC electrically variable device illustrated in FIG. 2A.

With this uniform layer geometry and appropriate electrode structure, incident light may be focused if the non-uniform refractive index distribution provides a spherical phase retardation profile as illustrated in FIG. 2B. The corresponding OP of the lens (in diopters that is the inverse of focal length F in meters) may be expressed as:

$$OP(D)=1/F=8\delta nd/(CA)^2$$

where d is the thickness (typically from 5 µm to 100 µm); $\delta n$ is the difference of refractive index between the center and the periphery of the lens zone (always less than the birefringence of the LC material $\Delta n=n_{//}-n_\perp$ by an approximate factor of 0.7-0.8); and CA is the diameter of a Clear Aperture.

With the same layer geometry and appropriate electrode structure, however providing a linear refractive index gradient, as illustrated in FIG. 2C, the resulting optical element may steer light as a prism. In this case, the steering angle $\alpha$ may be expressed as an electrically variable refractive tilt limit:

$$a(deg)\approx(180/\pi)\delta nd/CA$$

where $\delta n$ is the difference in refractive index between the left (L) and right (R) corners of the prism.

For certainty, the layer geometries illustrated herein are highly schematic and not to scale. As well, for ease of illustration and description, certain layers are omitted, including but not limited to: alignment layers sandwiching the liquid crystal layer, index matching layers, sealants, etc. In some geometries, certain illustrated substrates may be omitted (or removed) during (wafer level) manufacturing. Typically, a large number of such flat LC layer optical devices are wafer-level manufactured at the same time and then at least some are singulated from such wafers. Although not illustrated, the LC cells of individual devices are sealed on edge. Mention of relevant manufacturing steps is made herein, however other manufacturing steps are employed in various sequences known to persons of skill in wafer-level manufacturing.

The value of ($\delta n$ d/CA) is an important factor for both cases. A simplified estimation of the achievable focusing and steering potential (ability/degree) of these elements can be provided, for example for typical mobile imaging applications with the following values: $\delta n \approx 0.15$, $d \approx 50$ µm and $CA \approx 2$ mm. Approximately 10 Diopters of OP may be achieved by such a lens element. Often however larger CA values are required, for example in the order of $CA \approx 5$ mm, however expanding the simplified uniformly layered geometry illustrated in FIG. 2B unfortunately leads to achievable OP values which are unacceptably small since the factor ($\delta n$ d) cannot be increased too much due to scattering and device operating speed issues (see below).

As with the physical Fresnel lenses, employing LC electrically controlled principles to extend the clear aperture is difficult. Besides above problems mentioned with reference to FIG. 3, in providing electric field control of the orientation of LC molecules, it is difficult to have an electric field that can cause an abrupt change in the orientation of the LC molecules in portions of the device aperture between lensing zones. Such portion can be termed a "fly-back" portion or a non-linear zone (NLZ). The overall incident light beam is deformed by such non-ideal abrupt changes in phase delay between lensing zones. This results in a substantial portion of the aperture of the optical device between zones not being able to contribute to the desired optical operation of the device.

In co-pending U.S. Provisional Patent Application Ser. No. 62/083,665, entitled "Liquid Crystal Device with Improved Zone Transition" filed Nov. 24, 2014, which is incorporated herein by reference, proposes an alternate architecture to provide LC electrically variable Fresnel-type lenses having a flat LC layer developed based on the Fresnel zones principle using uniform nematic LC cells that are dynamically controlled via electric field control and have separated lensing zones. This creates a spatial variation in the optical phase delay that can provide Fresnel lensing.

A LC optical device geometry is proposed that provides a spatial variation in the optical phase delay with an abrupt transition at a boundary between zones (micro elements) that is not possible with conventional LC optical device electric field control electrode systems. A LC optical device is also proposed that improves the electric field control of LC molecular orientation at the boundary between lensing zones. This reduces improperly steered (redirected) or focused light, and it also increases the effective aperture of the optical device.

An improved phase delay transition at the boundary between lensing zones can be achieved using a combination of low and high frequency electric fields with a dual frequency LC.

An improved phase delay transition at the boundary between lensing zones can be achieved using floating electrodes that help to shape the electric field within the zones.

An improved phase delay transition at the boundary between lensing zones can be achieved using an electrical de-coupling zone based on isolation areas or at least one conductive wall arranged between LC lensing zones, so that the electric field acting on the LC of one lensing zone does not act on the LC of neighboring lensing zone.

An improved phase delay transition at the boundary between lensing zones can be achieved using a difference in the phase of electrical signals supplied to the electrodes of the LC zone elements, so that the electric field acting on the LC of one lensing zone is directed in part in a direction of the LC layer direction, with the result also that the electric fields generated by electrodes from neighboring lensing zones have a minimal influence of the phase delay profile.

Differences in voltage of the lensing zone electrodes can also be used to achieve the desired electric field and LC control interaction.

As described above, the corresponding OP of the lens (in diopters that is the inverse of focal length F in meters) may be expressed as:

$$OP(D)=1/F=8\delta nd/(CA)^2$$

where d is the thickness (typically from 5 µm to 100 µm); $\delta n$ is the difference of refractive index between the center and the periphery of the lens zone (always less than the birefringence of the LC material $\Delta n = n_{//} - n_{\perp}$ by an approximate factor of 0.7-0.8); and CA is the diameter of a Clear Aperture.

The thickness of the LC layers can be, for typical nematic LC material, between 5 µm to 100 µm (thicker is also possible), and normally would be between 20 µm to 100 µm, preferably around 50 µm.

It will be appreciated that the OP of a lens using a typical thickness of LC material and conventional LC material can be impractically low when the diameter of the clear aperture is greater than 4 mm. It has been found that a concentric band or zone surrounding the central lens having a diameter of about 2 mm to about 4 mm can expand the CA of the lens by 1 mm to 3.5 mm while providing an overall effective lens with good OP. This means that with one concentric zone, a lens can have a CA of at least 3 mm up to 7.5 mm. With two such concentric zones, a 1 cm CA lens is possible. Each boundary between zones brings a loss of transmission or image quality, however, and thus the proposed solution reduces the number and impact of such boundaries.

In accordance with an aspect of the proposed solution there is provided a LC optical device providing refractive Fresnel lens type element control over light passing through an aperture, the device including: a layer of LC material contained by flat substrates having flat alignment layers; and an arrangement of electrodes configured to provide a spatially varying voltage distribution within a number of lensing zones within said LC layer, the arrangement of electrodes comprises ring-shaped electrodes defining boundaries between Fresnel lensing zones; characterized in that the LC optical device is structured to provide a spatial variation in the optical phase delay with an abrupt transition at a boundary between lensing zones to increase the effective aperture of the optical device.

In some embodiments, the liquid crystal optical device further comprises a driver circuit configured to provide drive signals to the arrangement of electrodes.

In some embodiments, the liquid crystal layer comprises dual frequency liquid crystal material, the arrangement of electrodes comprises first and second ring shaped electrodes near a boundary between adjacent ones of the lensing zones, and a drive signal for said first electrode is of a low frequency for causing alignment of the dual frequency liquid crystal material parallel to the electric field, and a drive signal for said second electrode is of a high frequency for causing alignment of the dual frequency liquid crystal material perpendicular to the electric field.

In some embodiments, the device may further comprises a layer of one of a weakly conductive layer and a high resistivity layer for distributing an electric potential over a lensing aperture of the device.

In some embodiments, one of the weakly conductive layer and the high resistivity layer is patterned.

In some embodiments, the patterned layer has a discontinuity at said boundary between the lensing zones reducing penetration of the electric potential across the boundary.

In some embodiments, the arrangement of electrodes further comprise at least one electrically floating electrode that helps to shape the electric field within the lensing zones.

In some embodiments, the at least one electrically floating electrode includes multiple capacitively coupled concentric electrodes.

In some embodiments, the device further comprises at least one optically inert zone separating the lensing zones, each optically inert zone masking light beam deformation caused by the non-ideal abrupt change in phase delay between lensing zones.

In some embodiments, each optically inert zone comprises one of an index matching layer, a swath of light absorbing material and a conductive wall arranged between liquid crystal reservoirs of adjacent lensing zones so that the influence of the electric field acting on the liquid crystal of each lens zone on the liquid crystal of a neighboring lens zone is reduced.

In some embodiments, the driver circuit is configured to provide a potential difference in electrical signals supplied to the electrodes of each lensing zone at one substrate, so that the electric field acting on the liquid crystal of each lensing zone is directed in part in a direction of the liquid crystal layer direction. In some embodiments, the drive signal is an AC signal, and the potential difference is provided using a phase difference in said electrical signals.

In some embodiments, the optical device is configured to act on two orthogonal light polarizations comprising two said layers of liquid crystal arranged with liquid crystal orientations orthogonally between the two layers.

In some embodiments, the two layers of liquid crystal are close to each other and comprise one of: a common floating electrode and a common optically inert zone for providing the masking.

In some embodiments, at least one of arrangement of electrodes associated with one of the two layers of liquid crystal the comprises a decentered hole-patterned electrode.

In some embodiments, the device comprises four of the layers of liquid crystal close to each other and arranged with liquid crystal orientations orthogonally and in opposed directions among the four layers.

BRIEF DESCRIPTION OF THE DRAWINGS

The invention can be better understood by way of the following detailed description of embodiments of the invention with reference to the appended drawings, in which:

FIG. 3 is a schematic sectional diagram showing a LC Fresnel lens having a non-uniform substrate providing a spatially variable LC layer thickness;

FIG. 4 is a schematic sectional diagram of a portion of a non-uniform LC electrically variable lens geometry illustrating principles employed in providing the proposed solution;

FIG. 5 is a schematic sectional diagram of a LC electrically variable lens geometry providing a spatially non-uniform electrical field control using a hole patterned electrode and a weakly conductive layer in illustrating principles employed in providing the proposed solution;

FIG. 6 is a schematic sectional diagram of a LC electrically variable lens geometry providing a spatially non-uniform electrical field control using a floating electrode in illustrating principles employed in providing the proposed solution;

FIG. 7 is a schematic sectional diagram of a LC electrically variable lens geometry providing a spatially non-uniform electrical field control using an inner ring electrode in illustrating principles employed in providing the proposed solution;

FIG. 8A is a schematic sectional diagram illustrating a LC electrically variable lens geometry providing a spatially non-uniform electrical field control using a few inner ring electrodes in accordance with one embodiment of the proposed solution;

FIG. 10B is a schematic plot illustrating the theoretical variation of an optical phase across a comparatively larger clear aperture of the LC electrically variable lens geometry of FIG. 10A in accordance with the further embodiment of the proposed solution;

DETAILED DESCRIPTION

Figure 1C:
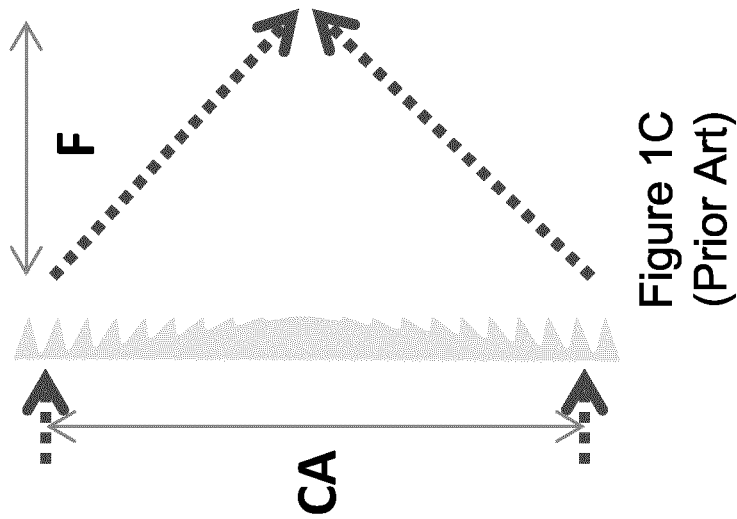
FIG. 1C is a schematic sectional diagram illustrating an Fresnel lens structure theoretically equivalent to the plano-convex lens of FIG. 1A.
Figure 1B:
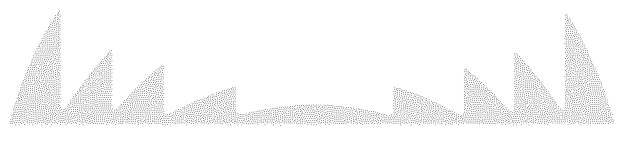
FIG. 1B is a schematic sectional diagram illustrating splitting a plano-convex lens into zones retaining curvatures of the plano-convex lens of FIG. 1A.
Figure 1A:
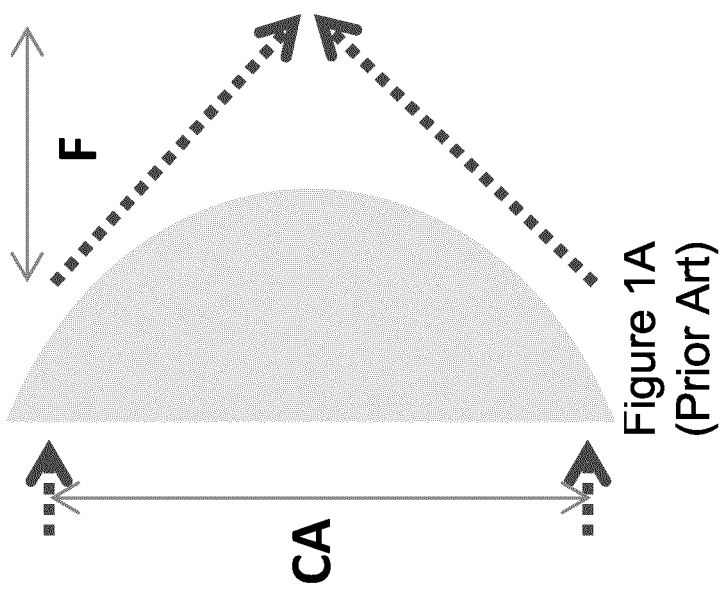
FIG. 1A is a schematic sectional diagram of a generic plano-convex lens.
Figure 2A:
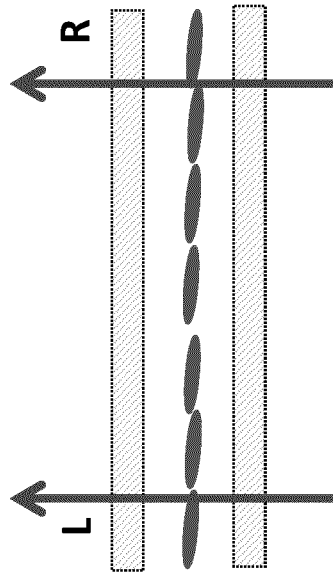
FIG. 2A is a schematic sectional diagram of a portion of a prior art LC electrically variable device in an unexcited state.
Figure 2B:
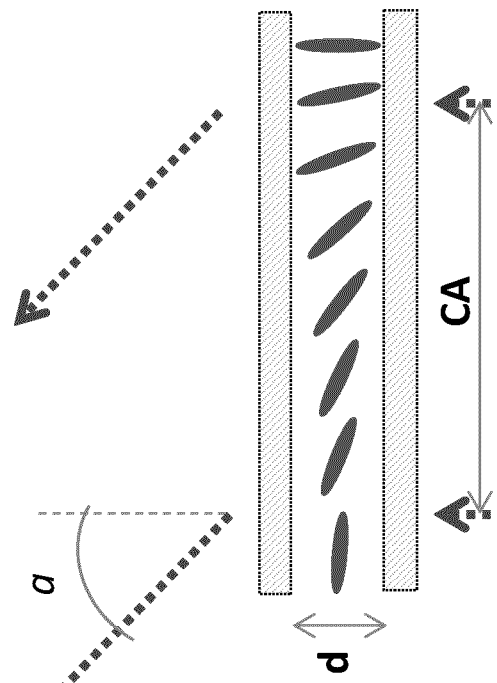
FIG. 2B is a schematic sectional diagram of a central portion of a prior art LC electrically variable lens device having a central aperture zone in which a spherical spatially variable electric field is applied in an excited state.

In accordance with an alternative approach, illustrated in FIG. 4, both substrates of the overall LC lensing geometry are flat to address the above mentioned problems. Multiple concentric electrodes illustrated in cross-section are etched on one of a pair of flat substrates sandwiching a LC layer of uniform thickness to reorient LC molecules to form a pattern of Fresnel type refractive index modulations. An alignment layer on the cell walls (not shown) keeps the ground-state nematic LC molecules aligned in one direction as illustrated in FIG. 2A. Such alignment layers (for example including rubbed polyimide) are well known in the art.

In the geometry illustrated in FIG. 4 the control electrodes are provided on the substrates inside the LC cell. This can reduce the required voltages however it is possible to arrange electrodes on the outside of the LC cell, for example on the opposite sides of the relatively thin substrates. As is known in the art, electrodes for a transmissive LC device can be transparent, for example including a coating of Indium Tin Oxide (ITO) material. While the drive signal for a LC cell is typically an AC signal, in some circumstances, it will be appreciated that low voltage DC signals can also be applied.

For large values of CA, this simple approach (without using a WCL) would require a very large (impractical) number of driven electrodes, e.g., up to 80 electrode rings, with very close positioning (spacing)≈1 µm to minimize the impact of abrupt changes of the electric field across each lensing zone. Correspondingly, such layered geometry, being cumbersome to manufacture, would also require a complex electronic signal driver. (Some operational aspects are described in the above referenced U.S. Provisional Patent Application Ser. No. 62/083,665, the entirety of which is incorporated herein by reference).

One possible way to avoid the use of such a large number of electrodes is described in commonly assigned U.S. Pat. No. 8,033,054, issued Oct. 10, 2015, the entirety of which is incorporated herein by reference, and includes employing a "hole-shaped" patterned electrode on the periphery of the lens (zone) as illustrated in FIG. 5 that is covered by a Weakly Conductive Layer (WCL) or a high resistivity layer. The WCL may form a spatially distributed RC circuit across the CA of the lens, CA which is defined in whole or in part by the hole-shaped electrode. For example, the "propagation" of the electric potential within the layered geometry may be described by Bessel functions, the corresponding generated electric field experienced inside the LC layer being stronger at the (zone) periphery close to the hole-shaped electrode compared to the center of the lens (zone).

As described in commonly assigned U.S. Pat. No. 8,994,915, issued Mar. 31, 2015, the entirety of which is incorporated herein by reference, the refractive index profile generated by the layered geometry illustrated in FIG. 5 is not perfectly spherical and the geometry generally illustrated in FIG. 6 was proposed to improve the wavefront characteristics. A parallel layer of spatially distributed capacitances C is added employing an electrically floating unconnected electrode. In implementations in which the electrically floating electrode has a limited extent, such shaped electrode is sometimes referred to as a puck.

To further improve and adjust the spatial profile of the refractive index, another modification, generally illustrated in FIG. 7, is proposed in International Application WO 2014/094165 published Jun. 26, 2014, claiming priority from U.S. Provisional Patent Application Ser. No. 61/738,533, filed Dec. 18, 2012, the entireties of which are incorporated herein by reference. The layered geometry illustrated in FIG. 7 employs an electrically driven "inner" ring-shaped electrode located within the hole-shaped patterned electrode and within the clear aperture of the device. In some implementations the inner ring-shaped electrode is at the same level within the layered geometry driven via a small gap of the hole-shaped electrode. With or without the electrically floating (puck) electrode, such LC lens devices can correct the electric field profile with very low optical aberrations.

However, the above-mentioned improvements, which do provide the benefit of reduced complexity of electrical control (employing only two driven electrodes), still represent a single CA device having a single central lensing zone and these advancements alone cannot efficiently generate a Fresnel type refractive index distribution to increase the CA diameter while providing high OP operation.

Figure 8B:
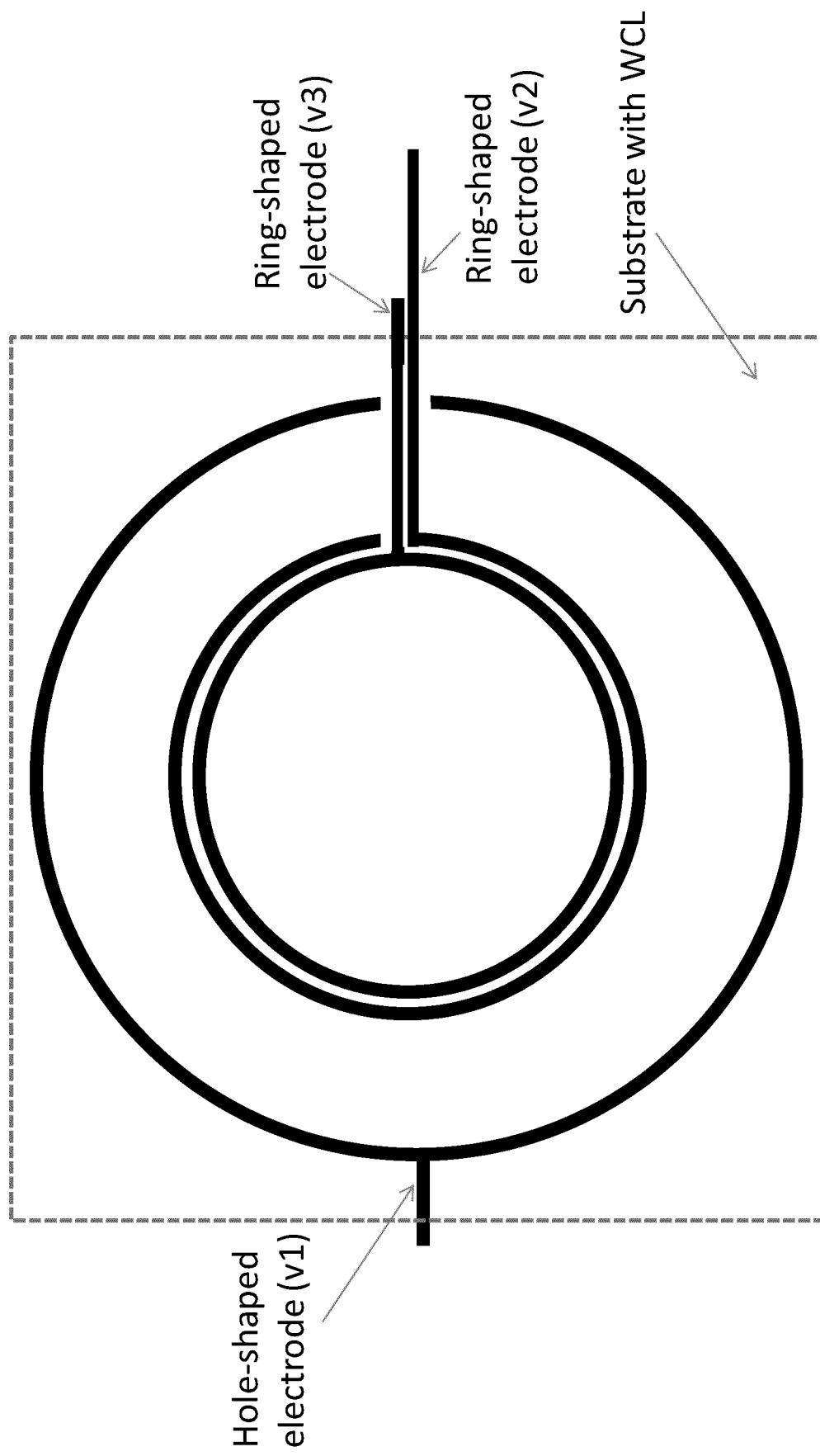
FIG. 8B is a schematic diagram illustrating a top view of the LC electrically variable lens geometry of FIG. 8A in accordance with one embodiment of the proposed solution.

In accordance with a first embodiment of the proposed solution, FIGS. 8A and 8B illustrate a LC electrically variable lens device having two concentric lensing zones while minimally increasing the number of driven electrodes (by one). As with previous LC layered geometries, to create well separated Fresnel zones with relatively abrupt jumps in phase between the lensing zones, the addition of a second inner electrode is proposed along with a larger diameter hole-shaped patterned electrode. By applying different control signal (RMS/amplitude) voltages V1, V2 and V3, and optionally different phase values, relatively abrupt changes in the electric field of the corresponding refractive index can be created between the lensing zones.

Figure 2C:
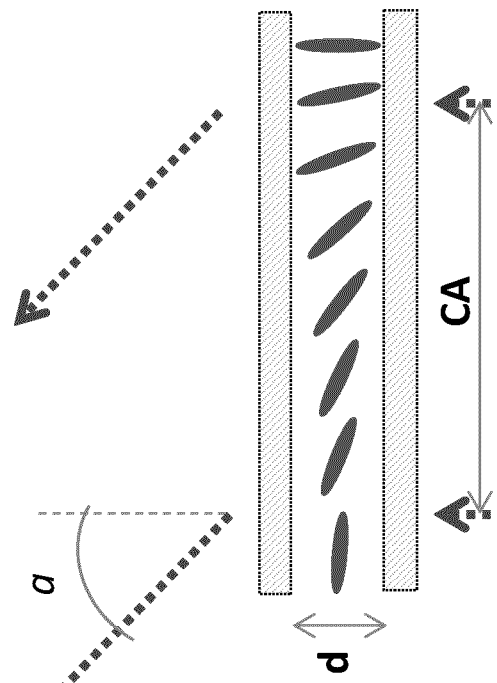
FIG. 2C is a schematic sectional diagram of a portion of a prior art LC electrically variable beam steering device in which a linear spatially variable electric field is applied in an excited state.
Figure 8C:
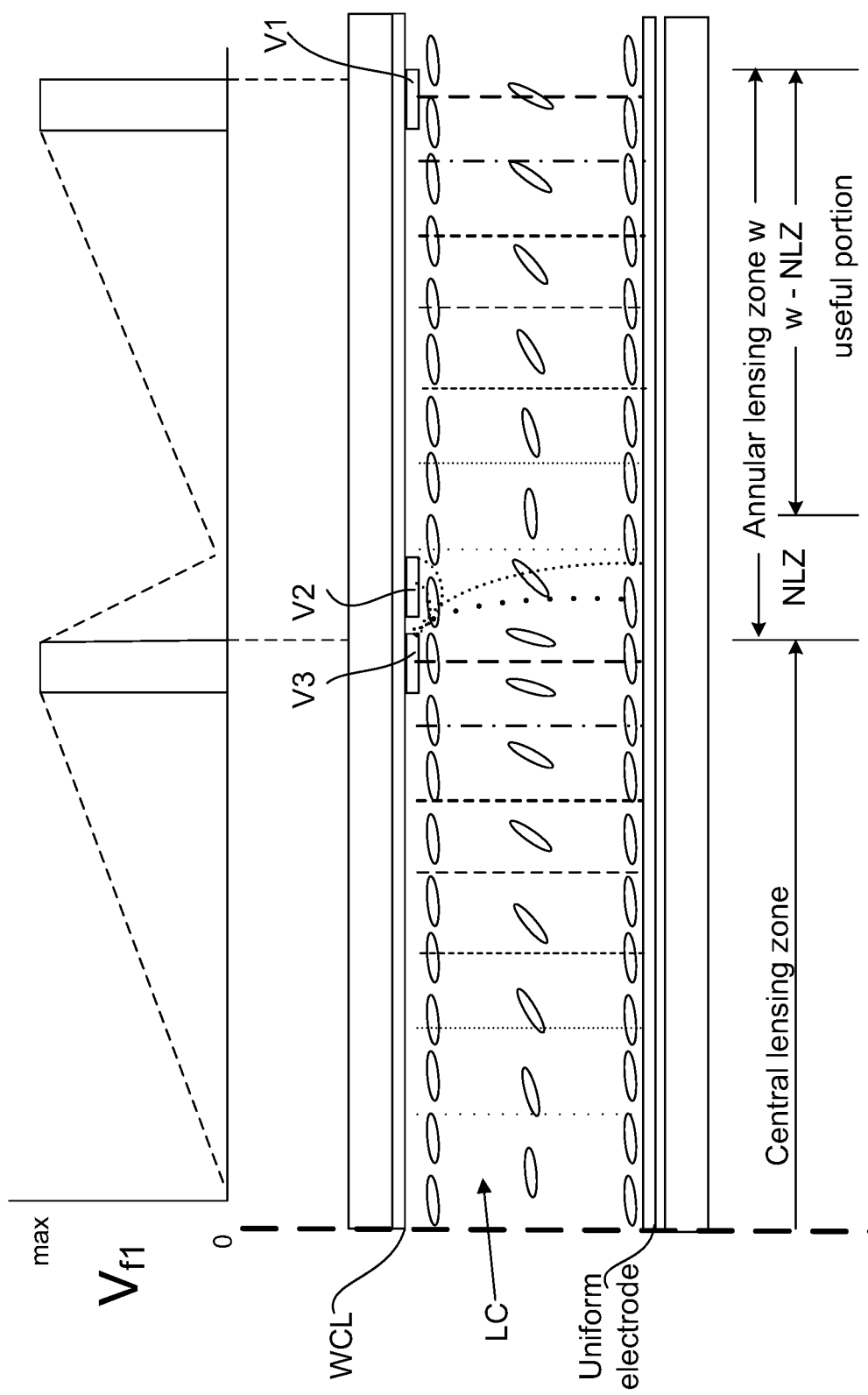
FIG. 8C is a schematic sectional diagram of a radial portion of a flat LC layer Fresnel lens device having two zones (or micro elements), in which control of the electric field is achieved by two inner ring electrodes defining a common zone boundary and a continuous layer of a highly resistive material or Weakly Conductive Layer (WCL) in accordance with one embodiment of the proposed solution.

With reference to FIG. 8C, the principle of operation of the central lensing zone illustrated in FIG. 8B is similar to that of the LC lensing device having the general layered geometry illustrated in FIG. 7 where the V3 electrode corresponds to the inner ring electrode and the V1 electrode corresponds to the hole-shaped electrode. The principle of operation the annular lensing zone illustrated in FIG. 8B is similar to that of the steering optical device illustrated in cross-section in FIG. 2C however operating in a centrosymmetric way overall. The weakly conductive layer helps to gradually spread the voltage across each lensing zone. The role of the electrode V2 is to provide abrupt change of electric field between two zones.

The zero or minimum voltage of ring electrode V2 of the annular lensing zone creates a fringing electric field with the neighboring maximum voltage of ring electrode V3 of the central zone having some field lines between the two electrodes at the zone boundary (the fringing electric field created affect molecular alignment within the zones). This is illustrated by the arcuate dotted lines between the ring electrodes. While the spreading out of the voltage can be controlled using the frequency of the voltages applied to electrodes V3 and V2 to shape the voltage distribution, the desired zero or minimum electric field in the annular lensing zone is not achieved. Furthermore, electric field lines are distorted thus leading to undesired orientation of the LC molecules.

Figure 8D:
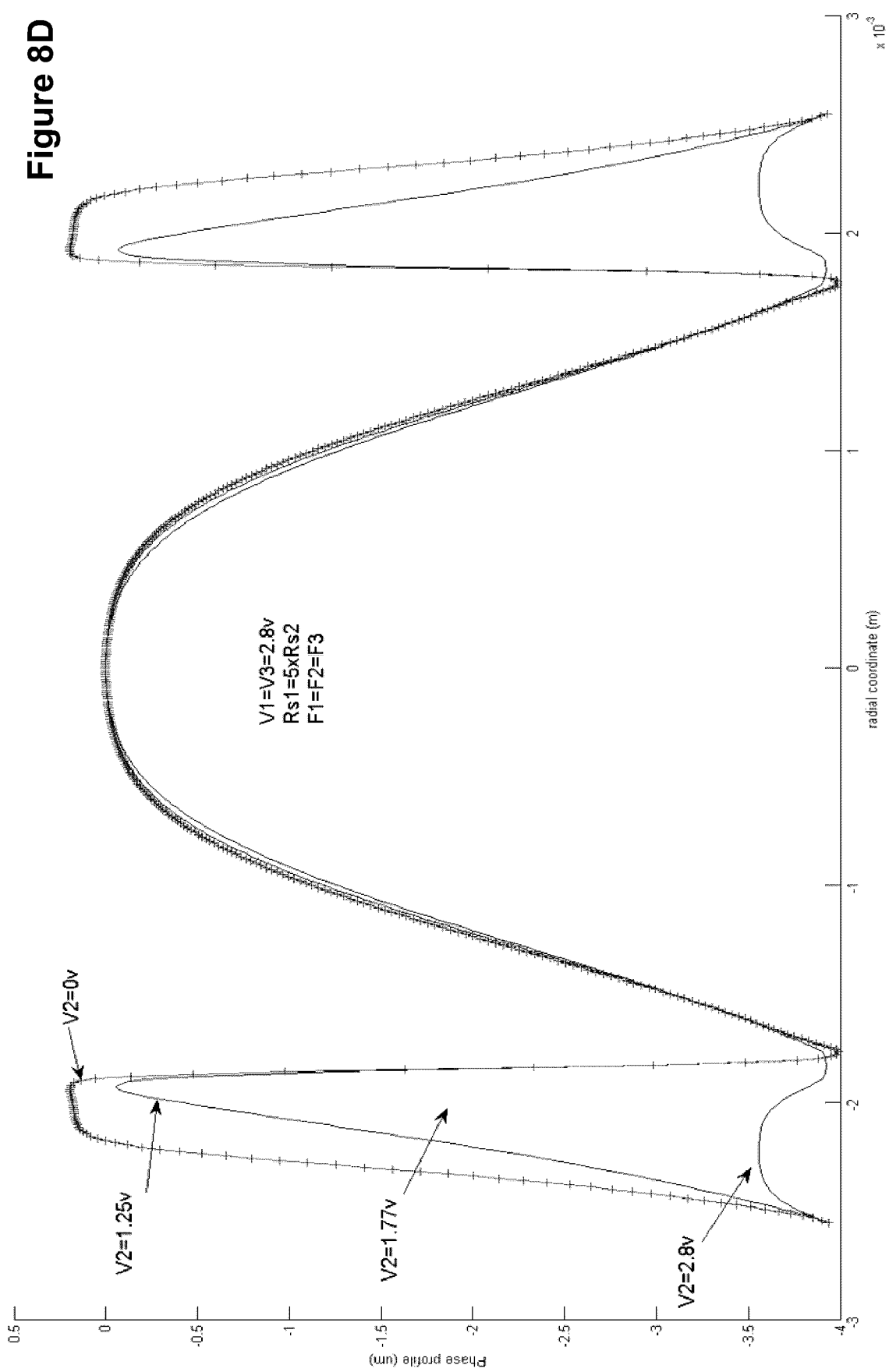
FIG. 8D is a schematic plot illustrating the variation of an optical phase across a comparatively larger clear aperture of the LC electrically variable lens geometry of FIGS. 8A and 8B in accordance with one embodiment of the proposed solution.

FIG. 8D illustrates various theoretical plots of optical phase distribution across a flat LC layer Fresnel lens device having an overall 5.5 mm CA. Overall, very similar phase profiles to those generated by traditional physical Fresnel structures (with non-uniform thickness) may be generated in a flat LC layered structure by using a limited number (2) of "zone" electrodes for a (comparatively) very large aperture, by adjusting the electrical control parameters applied to electrodes.

While an overall improvement is possible, some spatial "penetration" of the electric field (sometimes called "fringing field") from one lensing zone to another (see NLZ in FIG. 8C) may limit the capacity to avoid soft transitions. In the transition area between the central and annular lensing zones, a non-linear orientation zone (NLZ) is thus created where the electric field changes from being defined by Vmax down to a field defined by zero or Vmin. An abrupt change in the electric field is difficult to obtain under such conditions.

In accordance with another embodiment of the proposed solution, multiple capacitively coupled concentric ring electrodes can be used in combination with the WCL to provide a spatially controlled pattern of capacitances. As described in commonly assigned International Patent Application WO 2014/071530, entitled "Capacitively Coupled Electric Field Control Device", published May 14, 2014, which claims priority from U.S. Provisional Patent Application Ser. No. 61/725,021, the entireties of which are incorporated herein by reference, the large number of capacitively coupled ring-shaped patterned electrodes are configured to control the wavefront profile in the corresponding lensing zone while employing a limited number of lensing zone edge electrodes V1, V2 and V3.

Returning to the layer geometry illustrated in FIGS. 8A and 8B, in accordance with another embodiment of the proposed solution, substantially the same layered geometry illustrated in FIGS. 8A and 8B can be employed with dual frequency LC material employing different frequency control signals V2 and V3, such that the LC molecules in the extremity of one lensing zone orient themselves to be parallel to the electric field while the LC molecules in the adjacent lensing zone extremity orient themselves to be perpendicular to the electric field. The dual frequency LC is known in the art, for example MLC-2048 from Merck.

Figure 8E:
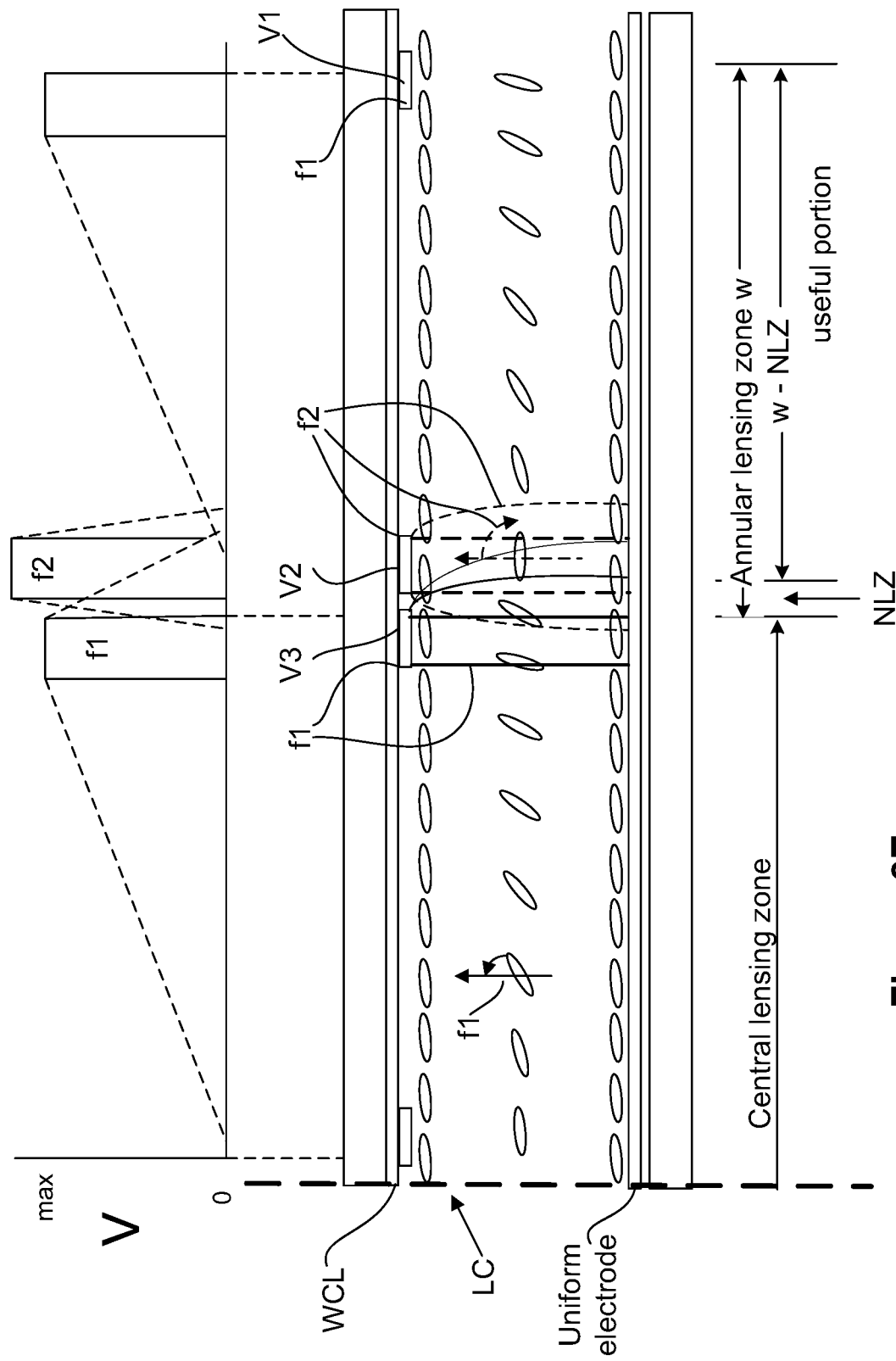
FIG. 8E is a schematic sectional diagram of a Dual Frequency LC (DFLC) Fresnel lensing device having two lensing zones, in which control of the electric field is achieved by two ring electrodes at the boundary between zones and a continuous layer of a highly resistive material to control the extent of the electric field across each zone, in which an electrode is supplied a high frequency electrical signal causing local alignment of the LC perpendicularly to an non-local alignment of LC with the electric field at lower frequencies.

With reference to FIG. 8E, electrode V2 is connected to a high frequency (illustrated as f2) voltage that acts on the LC to cause orientation perpendicularly to the electric field. With electrode V3 connected to a relatively low frequency (illustrated as f1) that causes orientation of the LC molecules parallel to the electric field, the LC within the cell is oriented by electrode V3 to be nearly orthogonal to the alignment layers, while the higher frequency provided to electrode V2 helps to force the LC molecules within the cell to be perpendicular to the electric field, and thus to stay parallel to the alignment layers. Because the frequency of the voltage applied to the electrode V2 is high, the WCL does not help to spread out the high frequency electric field as much as for the lower frequency applied to the electrode V3. The opposite situation may also be considered if the ground state alignment of the LC is different, for example, perpendicular to the alignment layers.

The electric field lines schematically illustrated in FIG. 8E as solid for f1 and dashed for f2. The two fields overlap and their effect is still felt on the LC material. Electrode V3 generates a relatively largely spread electric field that attempts to align the LC molecules parallel to the field at f1, while electrode V2 generates a relatively localized electric field that attempts to orient the LC molecules perpendicularly to the electric field at f2. The fields from the electrodes V3 and V2 overlap as illustrated, however, the LC molecules between electrodes V3 and V2 and the opposite uniform electrode are oriented as shown with a spatially compressed transition from substantially parallel orientation to substantially perpendicular orientation.

An example of a suitable frequency for f1 can be in the range of 1 kHz to 15 kHz depending on the properties of the LC and/or WCL layers and the geometry of the cell. An example of a suitable frequency for f2 is typically above 30 kHz, for example 50 kHz, depending on the properties of the DFLC material and the operating temperature.

The net effect is to have electric fields at different frequencies that overlap, while their effect on the LC molecules is to cause the rapid change (both in time and space) in LC orientation at the boundary with a resulting compression in the NLZ as illustrated.

Figure 9A:
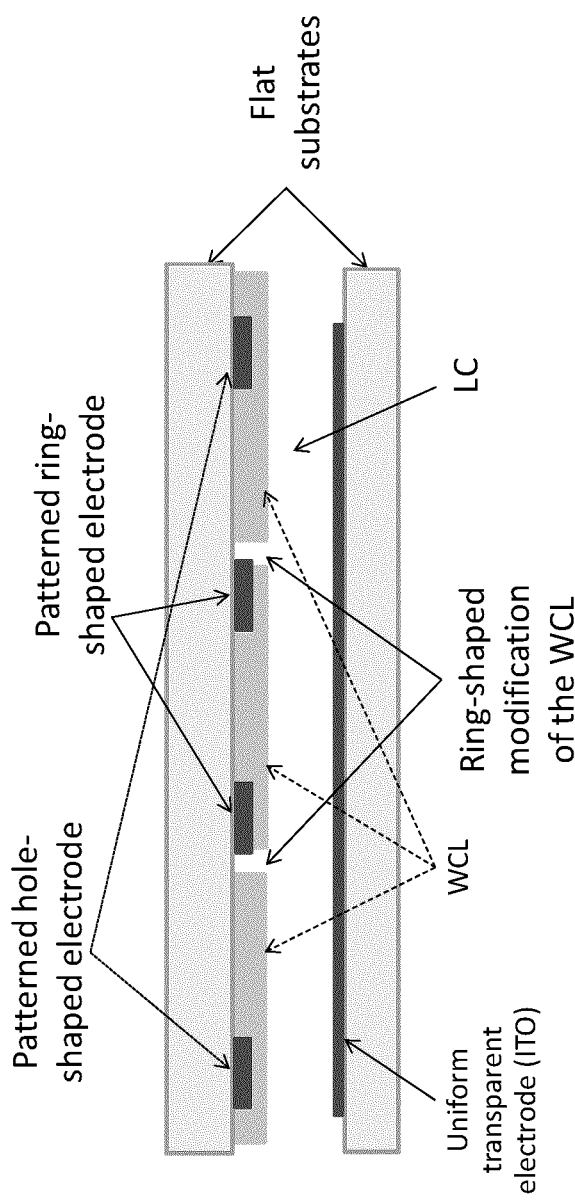
FIG. 9A is a schematic sectional diagram illustrating a LC electrically variable lens geometry having a discontinuous or patterned WCL in accordance with another embodiment of the proposed solution.
Figure 9B:
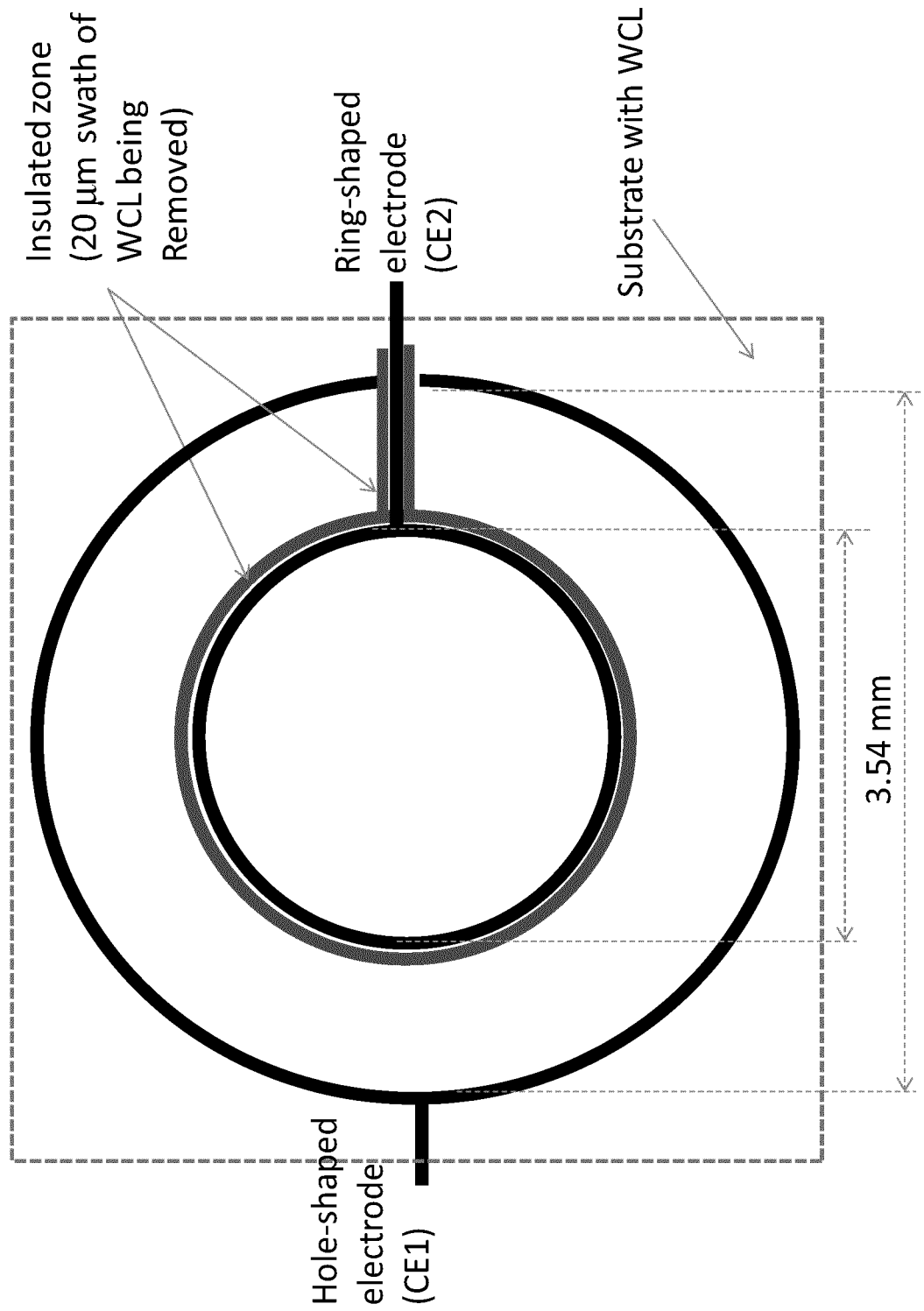
FIG. 9B is a schematic diagram illustrating a top view of the LC electrically variable lens geometry of FIG. 9A in accordance with another embodiment of the proposed solution.

In accordance with another embodiment of the proposed solution, FIGS. 9A and 9B illustrate another flat LC layer Fresnel lens geometry providing more spatially abrupt changes of the electric field experienced by the LC layer and exhibiting a more abruptly varying refractive index distribution. The (wafer level) fabrication of the WCL layer is patterned to include a gap in the form of a ring surrounding the inner ring-shaped electrode of the LC lensing device geometry illustrated in FIG. 7. For example the WCL layer can be: deposited through a mask leaving the gap on the substrate, selectively removed back (including etching or laser processing) or locally modified for example through annealing. For an overall device aperture of about 5.1 mm, a 20 µm WCL gap of about 3.54 mm diameter provides an improvement without cumbersome manufacturing. While not illustrated, this modification of the WCL can also be employed in the fabrication of the flat LC Fresnel lensing device geometry illustrated in FIGS. 8A and 8B with improved optical phase distribution across the aperture.

Figure 10A:
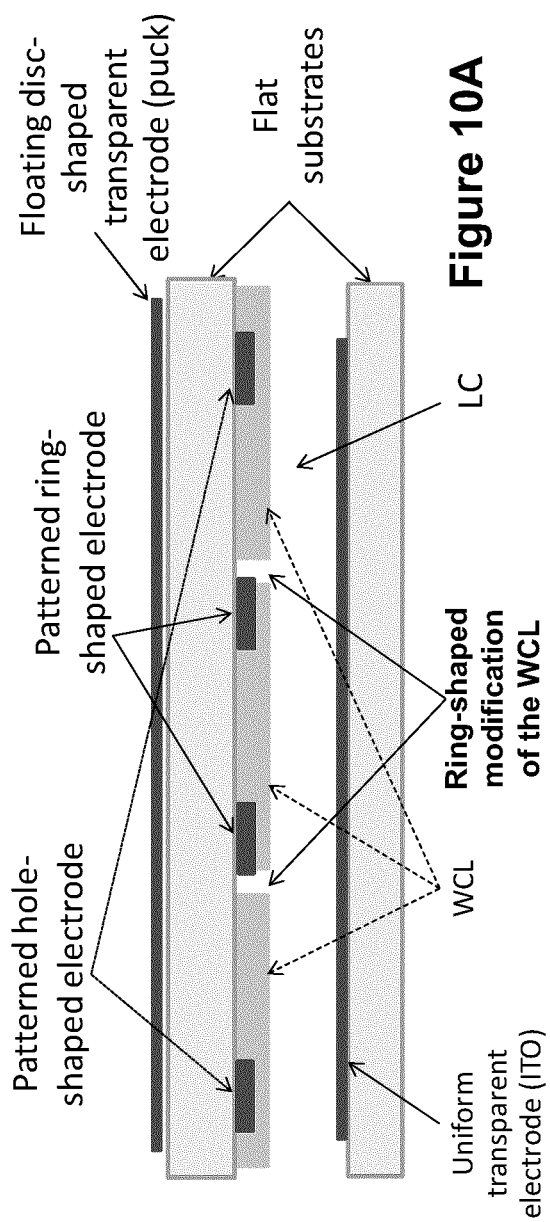
FIG. 10A is a schematic sectional diagram illustrating a LC electrically variable lens geometry having a patterned weakly conductive layer with a floating electrode in accordance with a further embodiment of the proposed solution.

In accordance with a further embodiment of the proposed solution, FIG. 10A illustrates a modified flat LC layer Fresnel lens device which besides the modified WCL (having a ring shaped gap) includes an electrically floating electrode, the combination of which can provide improved spatial distribution of: the electric field, refractive index variation and corresponding phase modulation (for light traversing the LC layered structure). The additional floating electrode can be uniform. However, the floating electrode can be patterned, used to further improve lens aberration control.

FIG. 10B illustrates two plots simulating the theoretical impact (effect) of the floating electrode (puck) on the optical phase distribution across the layered geometry illustrated in FIG. 10A corresponding a 5.5 mm CA. Overall, very similar phase profiles to those generated by traditional physical Fresnel structures may be generated in a flat LC layered structure by using limited number (2) of controlled electrodes for a (comparatively) very large aperture. The phase profile may be significantly improved by the addition of a floating electrode (puck). The plot shows a flatter central phase delay profile without the floating electrode (FIG. 9A) and an improved (closer spherical form) phase delay profile and better modulation depth with the floating electrode (FIG. 10A).

Figure 10C:
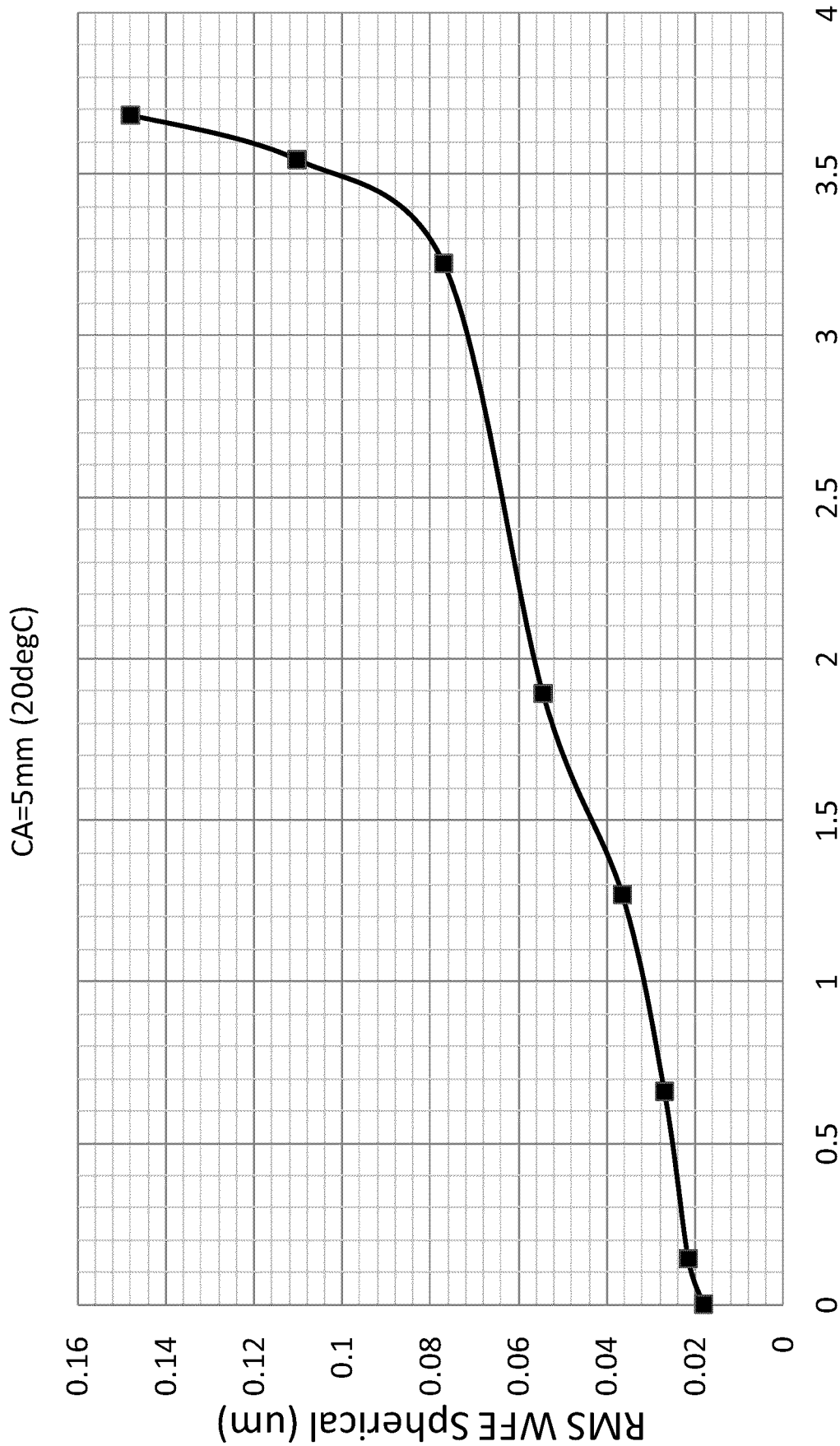
FIG. 10C is a plot illustrating an experimentally obtained variation of root mean square aberrations versus clear optical power phase across a comparatively larger clear aperture of a LC electrically variable lens having a geometry as illustrated in FIG. 10A in accordance with the further embodiment of the proposed solution.

FIG. 10C is a plot illustrating an experimentally obtained variation of Root Mean Square (RMS) aberrations versus Clear Optical Power (COP) across a comparatively larger 5 mm clear aperture of a LC electrically variable lens having a geometry as illustrated in FIG. 10A. Very small aberrations and high OP values (3.7D) are experimentally obtained in the same experimental conditions (LC, thickness, appropriate choice of voltages and frequencies, etc.) in which previously would only provide approximately 1.5D of usable OP in a single lensing zone design (akin to that illustrated in FIG. 6).

The quality of optical imaging systems employing the proposed flat LC layer Fresnel lens devices can be improved by various modifications which may be made to further improve lens performance.

For example, in accordance with an implementation of the various embodiments of the proposed solution, the electrode gap between the two inner ring-shaped electrodes illustrated in FIGS. 8A, 8B, 8C and 8E may be hidden by means of (controlled deposition/doping) of index matching materials (layers not shown). As well, the (annealed or removed) WCL layer gap illustrated in FIGS. 9A, 9B and 10A may be hidden by means of (controlled deposition/doping) of index matching materials (layers not shown).

Figure 11A:
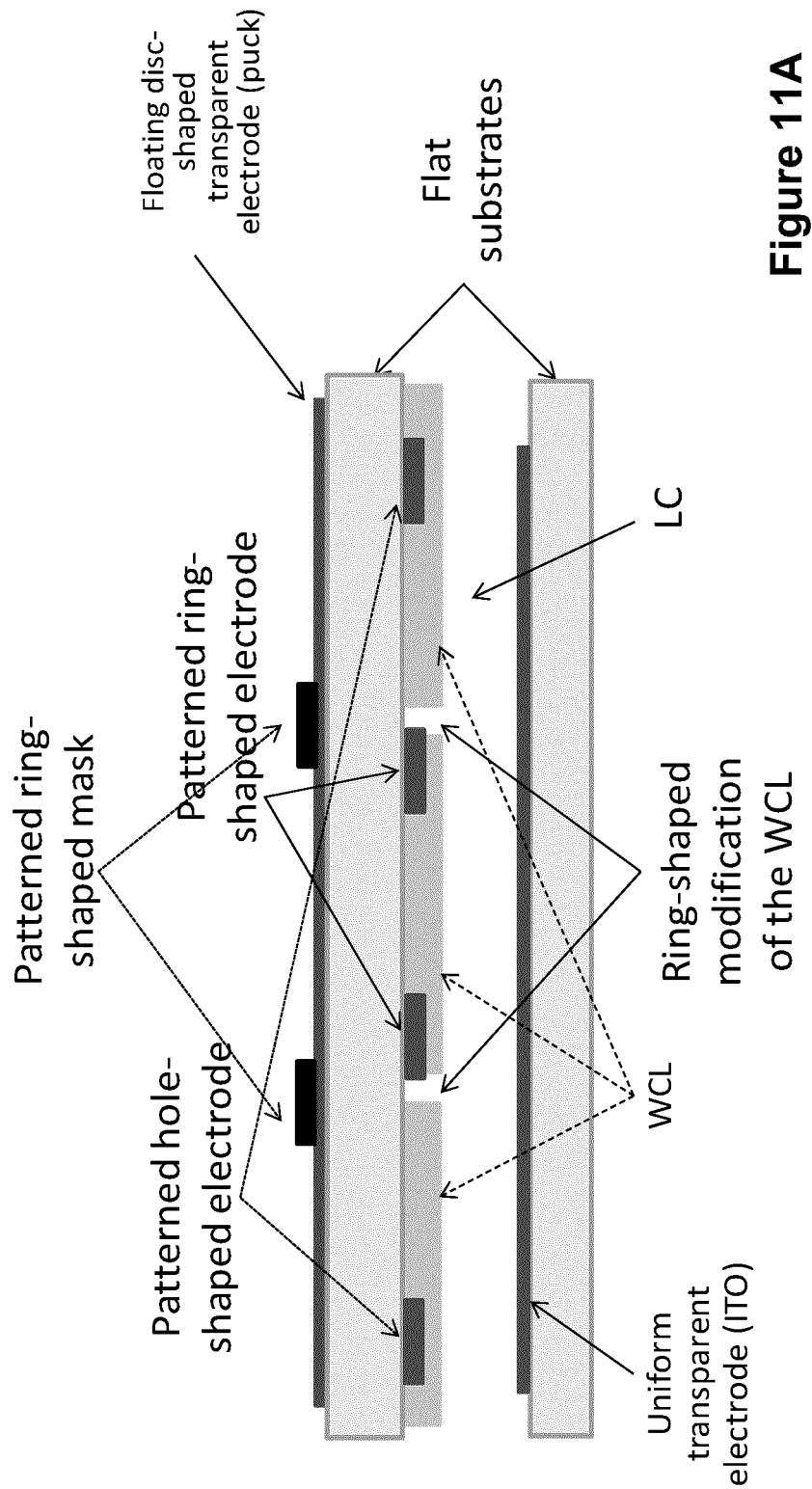
FIG. 11A is a schematic sectional diagram illustrating a LC electrically variable (half) lens geometry having a patterned WCL with a floating electrode with an absorbing zone masking the transition zone (the area of a WCL's discontinuity) in accordance with a implementation of proposed embodiments.

As another example, in accordance with another implementation of the various embodiments of the proposed solution, the area near the gap between the two inner ring-shaped electrodes illustrated in FIGS. 8A, 8B, 8C and 8E may be hidden by means of a controlled deposition/doping of a narrow absorbing ring (not shown) on/of top and/or bottom substrates to hide optical imperfections, soft corners and/or discontinuities between the lensing zones. As well, the (annealed or removed) WCL layer gap illustrated in FIG. 10A may be hidden by means of a controlled deposition(/doping) of a narrow absorbing ring on(/of) top (and/or bottom) substrate as illustrated in FIG. 11A to hide optical imperfections and discontinuities between the lensing zones around and about the modified WCL swath (zone). While not illustrated separately, an absorbing zone masking a WCL discontinuity can be also employed without the floating electrode in layered geometries as illustrated in FIGS. 9A and 9B.

As it may be apparent, the flat LC layer Fresnel lens geometries described hereinabove illustrate a single LC layer. Such a device acts on a single linear polarization of light, and unpolarized light passing through the device is processed by the device as two linear polarization states. The spatial modulation of the index of refraction in the LC material is with respect to one polarization of light, while the other polarization does not undergo any spatial modulation of the index of refraction. Such devices can be directly used to focus a single light polarization and such lensing optical devices are in this sense referred to as polarization dependent half lenses. For example, in accordance with an implementation, by using multiple acquisitions and image processing, such polarization dependent flat LC layer Fresnel lenses might also generate images focusing non-polarized light (containing two non-coherent cross oriented linear light polarizations).

Figure 11B:
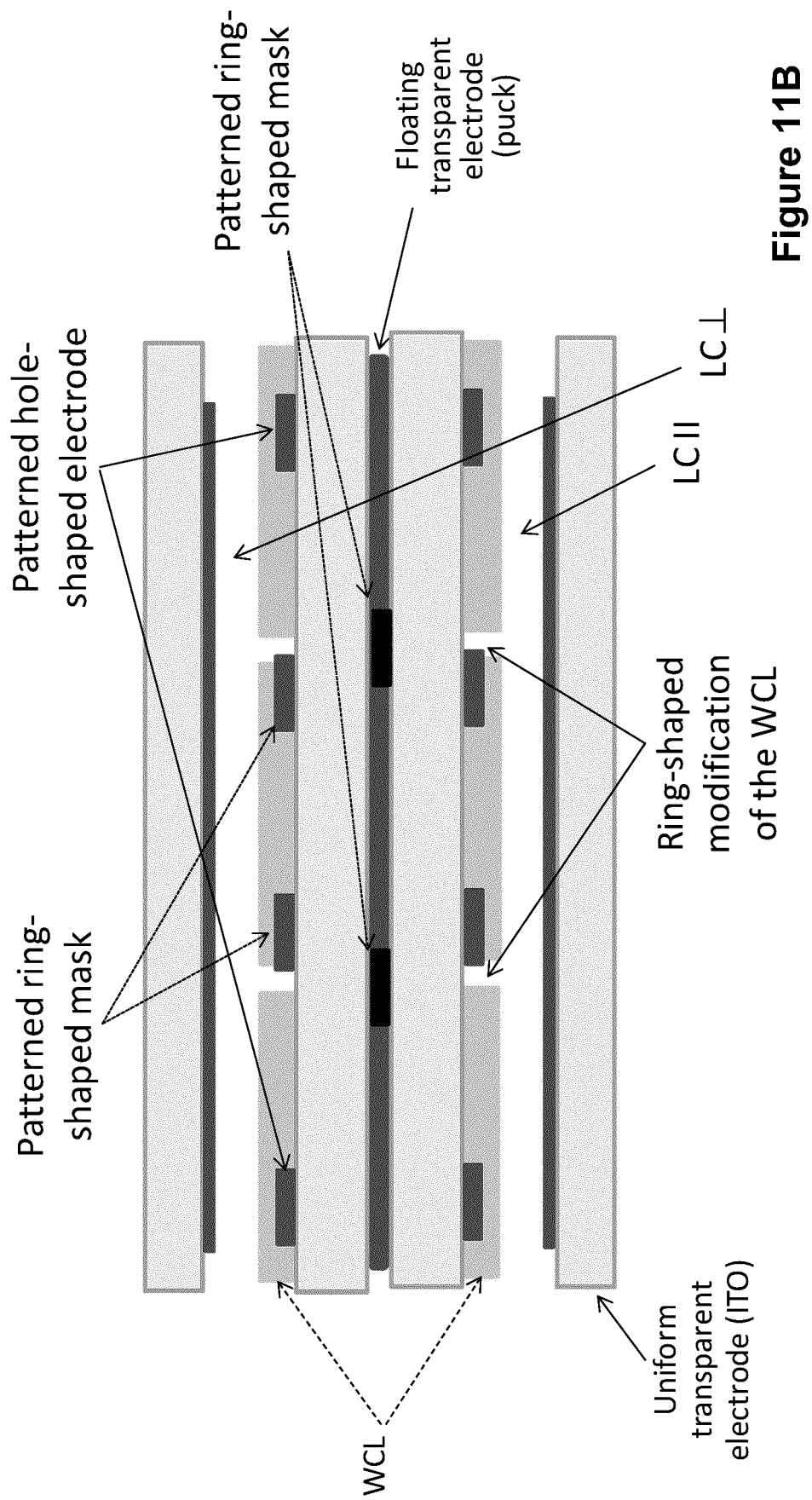
FIG. 11B is a schematic sectional diagram illustrating a LC electrically variable dual lens geometry having a patterned WCL with a floating electrode with an absorbing zone masking the WCL's discontinuity zone in accordance with another implementation of proposed embodiments.

In accordance with another implementation illustrated in FIG. 11B, employing a second similar half lens with the second LC's optical axis being perpendicular to the LC optical axis of the first half lens would enable the focusing and imaging of non-polarized light as a full lens without additional image processing. Electrodes V1, V2 and V3 are provided for the additional cell in a manner similar to the first cell. In some cases the same floating electrode and the same ring shaped mask may be used for both half lenses (see FIG. 11B). For some uses of such flat LC layer Fresnel full lenses in certain optical systems, for example in an intraocular prosthesis, the birefringent splitting of the polarizations can also introduce a shift. As described in International Patent Application WO 2014/138974, published Sep. 18, 2014, which is incorporated herein by reference, the optical axes of each flat LC layer Fresnel half lens can be decentered with respect to the optical axis of the overall optical system, in the case of an intraocular prosthesis decentered with respect to the normal axis of the implanted eye.

It is also known from international patent application publication WO2009/146530 published 10 Dec. 2009 to arrange four cells together, with alignment layers of two cells acting on the same polarization direction being in opposite directions. Such an arrangement improves symmetry and reduces the sensitivity or image aberrations of the overall device to light that is not parallel to the optical axis of the device as the light passes through the device.

Figure 12A:
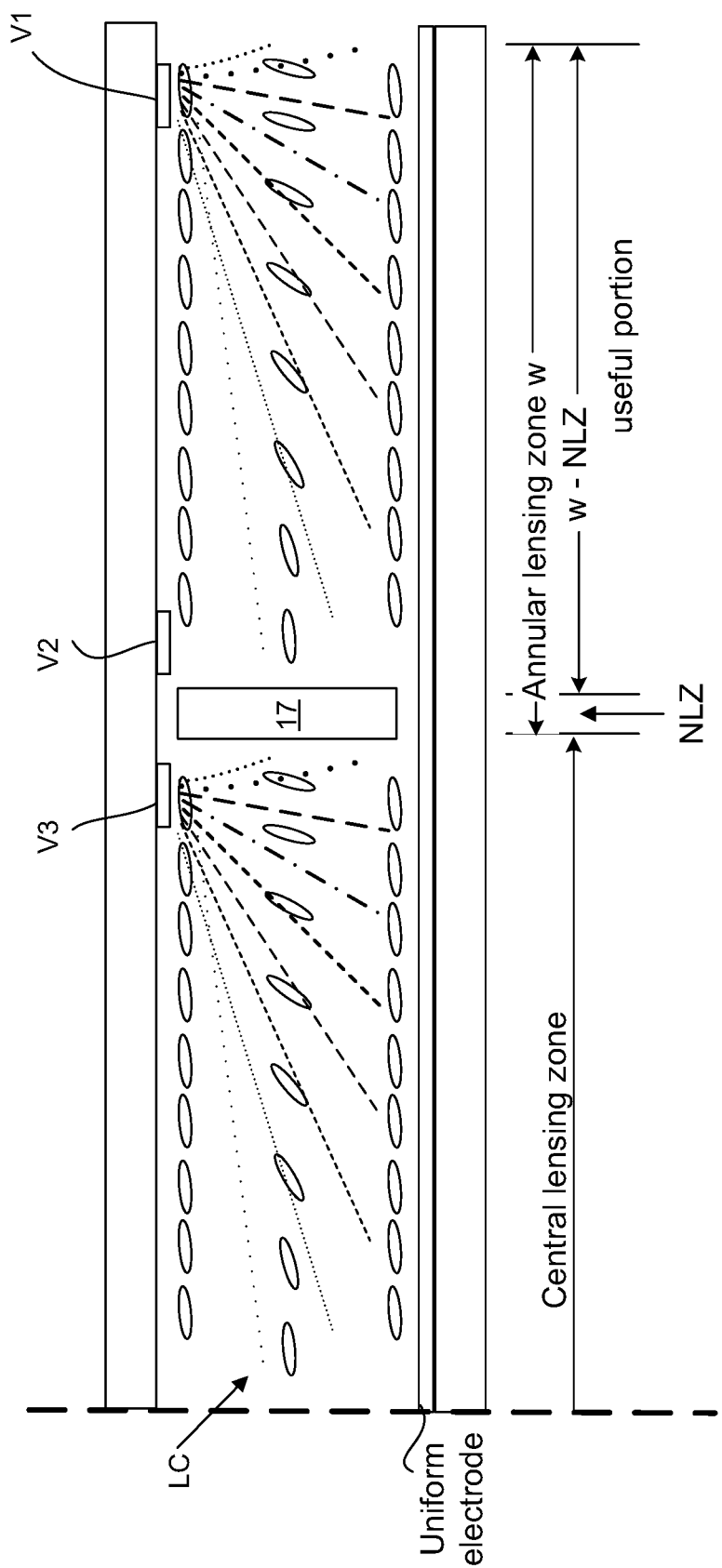
FIG. 12A is a schematic cross-sectional diagram across neighboring lensing zones of a flat LC layer Fresnel lens device, in which control of the electric field is provided by two control electrodes between the lensing zones employing a conductive wall in the transition zone in accordance with an implementation of the proposed solution.

As further example, in accordance with another implementation of the various embodiments of the proposed solution, the gap between the two inner ring-shaped electrodes V3 and V2 illustrated in FIGS. 8A, 8B, 8C and 8E may be hidden by means of a conductive wall 17 in the transition between lensing zones to reduce the fringing field of each lensing zone from penetrating into the adjacent lensing zone and thus creating the NLZ. FIG. 12A illustrates the radial geometry of such flat LC layer Fresnel lens. An isolation layer (not shown) can be employed between electrodes V3/V2 and conductive wall 17. Conductive walls 17 can be shorted to uniform planar electrode (or grounded). For clarity, connecting uniform planar electrode and the conductive wall 17 to the same voltage can be selectively achieved externally in driver circuit. This has been found to reduce the NLZ and to improve Fresnel lens operation efficiency.

Figure 12B:
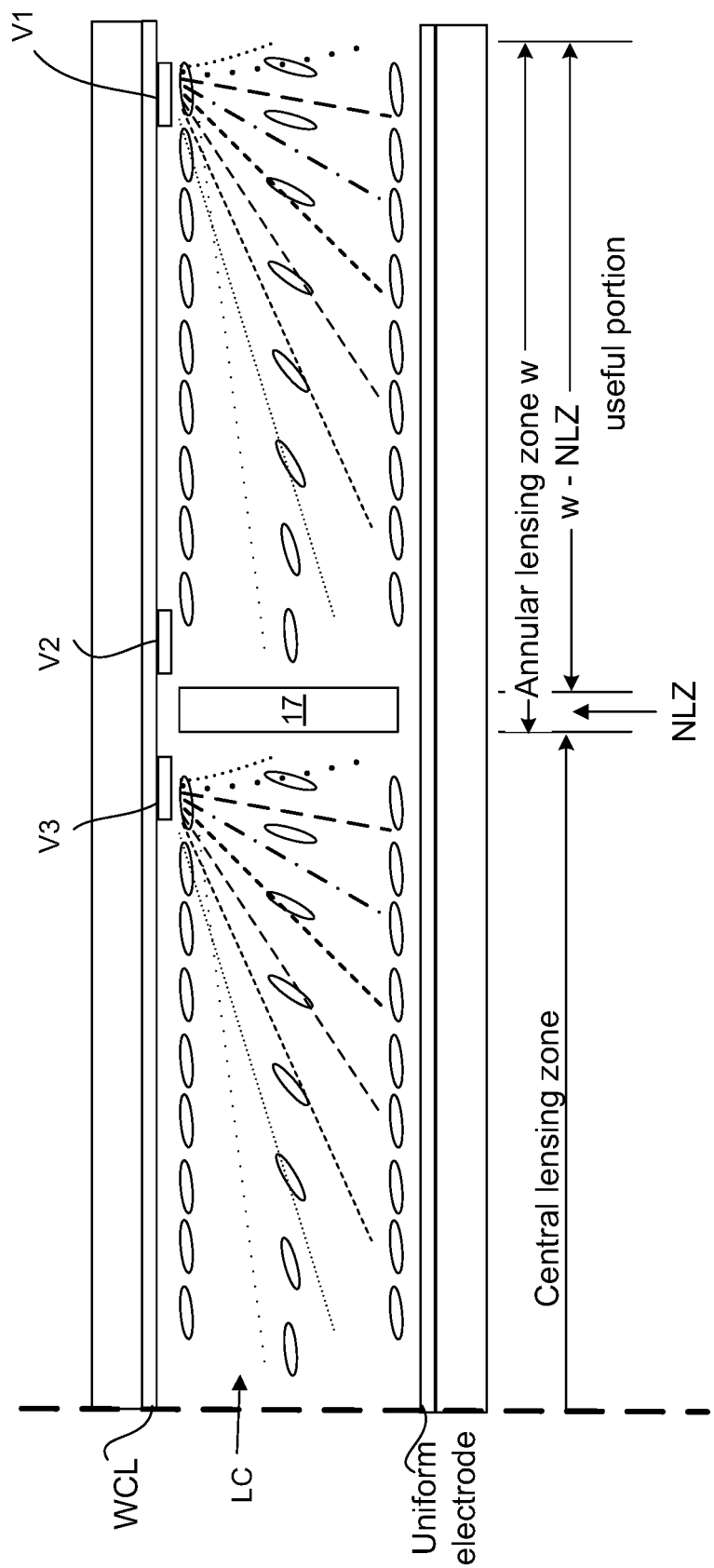
FIG. 12B is a schematic cross-sectional diagram across neighboring lensing zones of a flat LC layer Fresnel lens device similar to the one illustrated in FIG. 12A, in which control of the electric field is enhanced by the use of a layer of a weakly conductive material to help extend the electric field across each lensing zone in accordance with the proposed solution.
Figure 12C:
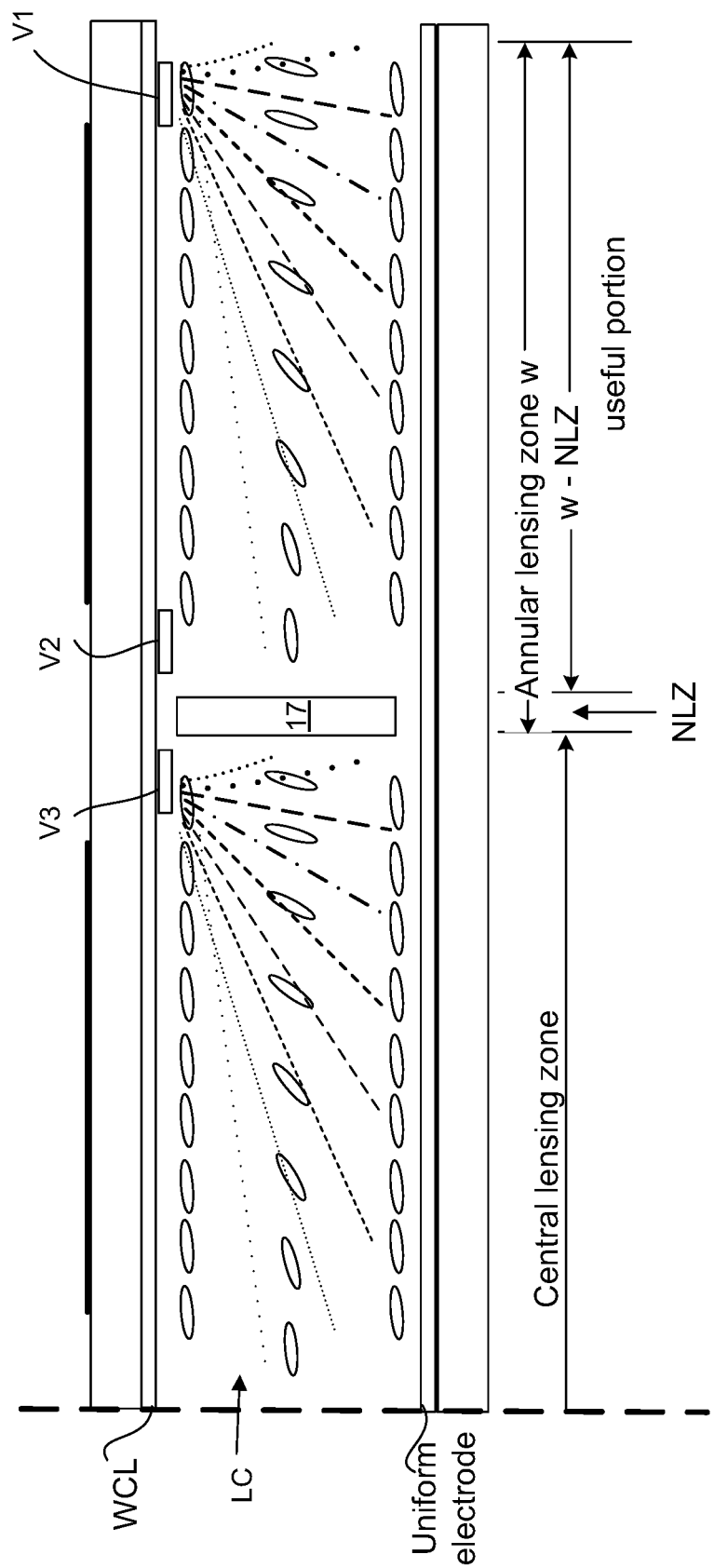
FIG. 12C is a schematic cross-sectional diagram illustrating another flat LC layer Fresnel lens device as illustrated in FIG. 12A having an electrically floating electrode in accordance with another embodiment of the proposed solution.

FIG. 12B illustrates another embodiment of the proposed solution employing a WCL or highly resistive layer in the optical device geometry illustrated in FIG. 7A. An improved phase retardation profile can be provided by controlling the frequency of the drive signal components supplied to electrodes V3 and V2. The use of a floating electrode, in accordance with a further embodiment of the proposed solution, is illustrated in FIG. 12C, to improve the electric field profile.

Drive circuitry (not shown) for such a flat LC layer Fresnel lens device can be implemented using: dedicated circuitry, FPGA devices, DSP devices and can include a programmed processor for control. When drive signals of multiple frequencies are employed, such drive circuitry can include a signal driver operating at frequency f1 and another signal driver operating a frequency f2. The drive signals are provided to electrodes V3, V2 and V1 while the opposite uniform planar electrode is a common electrode. Such signal drivers can be controllable to be simply on or off, or they can be variably adjustable to control variably controllable optical parameters, including but not limited to lensing power. The driver circuits can also be frequency tunable and/or voltage tunable, as well the driver circuits can provide drive signals having phase differences therebetween. The driver can also use sensor signals, such as indicating the temperature of the device, to optimize the driving signal characteristics. A controller can be employed along driver circuitry to provide settings for the signal drivers, for example in response to an external control signal input. Such a controller can be provided separately from the signal drivers, for example in software/firmware. The controller typically includes stored calibration data to allow a control signal to be translated into specific driver signal values. When the flat LC layer Fresnel lens is employed to provide lensing operation in an intraocular prosthesis the signal drivers can be implemented within the intraocular prosthesis, however the controller can be implemented within the intraocular prosthesis or external to the intraocular prosthesis, for example within the frame of a pair of glasses (planos). Such planos may only be worn when a change in the operation of the intraocular prosthesis is desired, say for example when the wearer changes activities between reading and driving. Further operational and device configuration details are provided in International Application WO 2014/176,695, entitled "Reprogrammable Tunable Liquid Crystal Lens Intraocular Implant and Methods Therefor", published Nov. 6, 2014, claiming priority from U.S. Provisional Patent Application Ser. No. 61/817,660, the entireties of which are incorporated herein by reference.

Figure 11C:
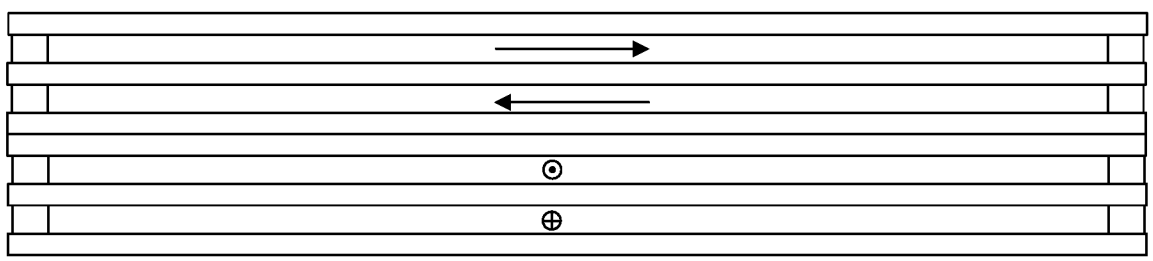
FIG. 11C is a schematic sectional diagram illustrating the combination of four LC layers (to focus unpolarized light) in a configuration of symmetric phase modulation, the pretilt angles of a pair of LC layers having opposed signs and a pair of LC layers having molecules oriented in perpendicular planes in accordance with yet another implementation of proposed embodiments.

As mentioned herein above, the spatial modulation of the index of refraction in each LC material layer acts on extraordinary polarized light, while the other ordinary polarized light does not experience a spatial modulation in that LC material layer. In order to control unpolarized light passing through the flat LC layer Fresnel lens device, a second such flat LC layer Fresnel lens device is typically employed with alignment layers oriented orthogonally to those of the first flat LC layer Fresnel lens device to act on the other polarization as schematically illustrated in FIG. 11B, that is electrodes V1, V2 and V3 are provided in respect of an additional LC cell in a manner similar to the first LC cell. It is also known from International Patent Application WO2009/146530 published 10 Dec. 2009, which is incorporated herein by reference, to arrange four LC cells together, with alignment layers of two LC cells acting on the same light polarization however having alignment layers with their pretilt angles pointing in opposite directions as schematically illustrated by arrows in FIG. 11C. Such an arrangement of four LC layers (cells) reduces the angular sensitivity or image aberrations of the flat LC layer Fresnel lens device to incident light that is not parallel to the optical axis of the overall device as the light passes through the overall device.

Figure 13:
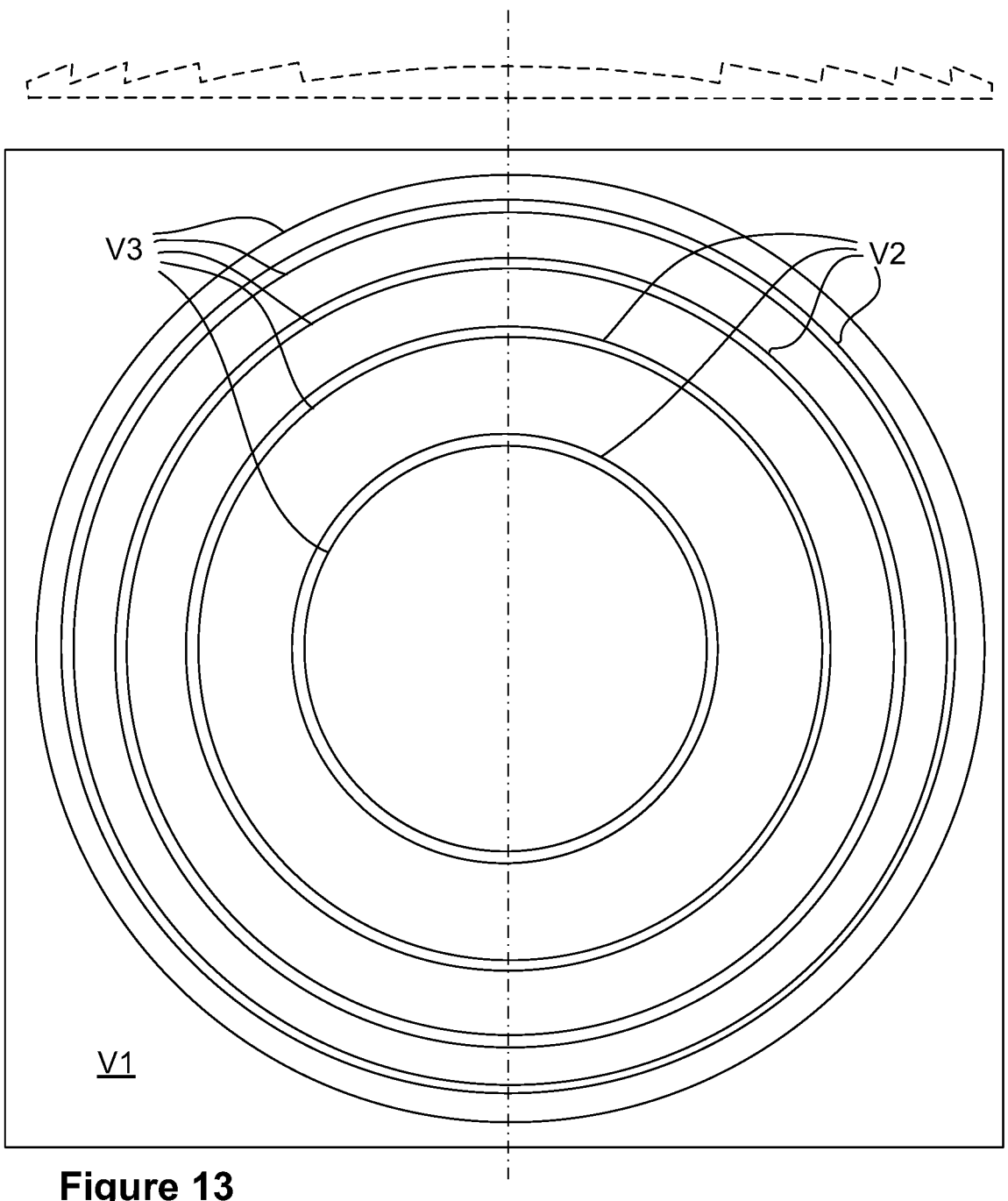
FIG. 13 is a schematic cross-sectional diagram illustrating a plan view of flat LC layer Fresnel lens device having multiple lensing zones having a circular geometry including a central circular micro element and multiple concentric band micro elements in accordance with the proposed solution, wherein similar features bear similar labels throughout the drawings. While the layer sequence described is of significance, reference to "top" and "bottom" qualifiers in the present specification is made solely with reference to the orientation of the drawings as presented in the application and do not imply any absolute spatial orientation.

While the figures illustrate a flat LC layer Fresnel lens device having two lensing zones the invention is not limited thereto. The two lensing zone arrangement is only illustrated to present the proposed solution with reference to a single lensing zone boundary used to cause LC to change orientation across the zone boundary between Fresnel lensing zones. Multiple reduced non-linear zones in accordance with the proposed solution can also be achieved in a variety of Fresnel lens designs, for example a five Fresnel lensing zone device as illustrated in FIG. 13. Such multiple Fresnel lensing zone flat LC layer optical devices are only limited by the complexity of signal traces and the complexity of the signal driver electronics.

The profile of a conventional refractive counterpart lens is illustrated in dashed lines in cross-section aligned with a five zone flat LC layer Fresnel lens device having similar behavior. The central zone is created by the central ring electrode V3 providing in combination with weak conductive material (not shown) an axially symmetric voltage distribution in the central area that tends to zero near the optical axis. In this illustration, the bands are maintained as the same size as the conventional Fresnel lens, however, it will be understood that the dimensions of each micro element using such LC devices will be typically much smaller and more numerous than would be used when making a Fresnel lens from a thicker optical refractive material. The inner ring electrodes V3 and V2 are shown with greater separation than would normally be implemented for ease of illustration only. The electrical connections between the inner electrodes V3 and V2 and the drive signal sources (see FIG. 8B) are also not illustrated for ease of illustration.

The devices illustrated schematically in the figures and described above can be employed in a variety of applications including redirection of light emitted by LED light sources for illumination purposes. For example, only annular lensing zones may be employed in redirecting light from a ring shaped light source around a microscope objective in a flat LC layer Fresnel lens device without the central lensing zone to increase contrast.

LC materials can also be used for focusing infrared light, for example 850 nm. It will also be appreciated that flat LC layer Fresnel lens optical devices can be made according to above embodiments that are operative into the terahertz frequency, namely within the wavelength range of 8000 to 14000 nm of human body radiation. Thus tunable control over Fresnel refractive lenses of a (projected) beam of infrared light for detectors sensitive to this range of wavelengths can find useful application, for example, in the optics of infrared motion detectors.

What is claimed is:

1. An electrically controllable multiple zone gradient index lens comprising:

liquid crystal cells each having at least two layers of liquid crystal material each between a first alignment layer on a first substrate and a second alignment layer on a second substrate, wherein said liquid crystal cells are arranged over one another to act on both linear polarizations of light;

each liquid crystal cells having an electrode structure comprising a uniform transparent electrode on said first substrate and at least two ring-shaped electrodes on said second substrate, wherein the electrode structure defines at least two lensing zones comprising a central lens formed by an inner electrode of said at least two ring-shaped electrodes and at least one Fresnel-type concentric band lens formed by at least one outer electrode of said at least two ring-shaped electrodes, said central lens having an aperture of at least about 2 mm and less than 4 mm in diameter and said at least one concentric band lens element each expanding a diameter of an aperture of said central lens by at least 1 mm to less than 3.5 mm; and one of a weakly conductive layer and a high resistivity layer enclosing said at least two ring-shaped electrodes for distributing an electric potential over a lensing aperture and having at least one gap between lensing zones of said at least two lensing zones.

2. The liquid crystal optical device as defined in claim 1, further comprising a driver circuit configured to provide drive signals to said arrangement of electrodes.

3. The device as defined in claim 2, wherein the driver circuit is configured to provide a potential difference in electrical signals supplied to the electrodes of each lensing zone at one substrate, so that the electric field acting on the liquid crystal of each lensing zone is directed in part in a direction of the liquid crystal layer direction.

4. The device as defined in claim 1, wherein the drive signal is an AC signal, and the potential difference is provided using a phase difference in said electrical signals.

5. The device as defined in claim 1, wherein said layers of liquid crystal material are between about 25 mm to about 100 mm thick.

* * * * *